US010848609B2

(12) United States Patent
Konji

(10) Patent No.: US 10,848,609 B2
(45) Date of Patent: Nov. 24, 2020

(54) INFORMATION PROCESSING METHOD, STORAGE MEDIUM, AND INFORMATION PROCESSING DEVICE

(71) Applicant: CANON KABUSHIKI KAISHA, Tokyo (JP)

(72) Inventor: Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 16/048,546

(22) Filed: Jul. 30, 2018

(65) Prior Publication Data
US 2018/0359638 A1 Dec. 13, 2018

Related U.S. Application Data

(63) Continuation of application No. PCT/JP2017/007481, filed on Feb. 27, 2017.

(30) Foreign Application Priority Data

Mar. 31, 2016 (JP) .................... 2016-072752

(51) Int. Cl.
*H04W 12/06* (2009.01)
*H04M 1/725* (2006.01)
(Continued)

(52) U.S. Cl.
CPC .......... *H04M 1/7253* (2013.01); *H04W 4/80* (2018.02); *H04W 8/005* (2013.01);
(Continued)

(58) Field of Classification Search
CPC ....... H04W 12/06; H04W 8/005; H04W 4/80; H04W 76/10; H04W 8/02; H04W 84/12; H04W 12/0608; H04M 1/7253
See application file for complete search history.

(56) References Cited

U.S. PATENT DOCUMENTS 10,136,245 B2 * 11/2018 Sueyoshi ............... H04L 63/10
2014/0154987 A1 6/2014 Lee
(Continued)

FOREIGN PATENT DOCUMENTS

CN 103632452 A 3/2014
CN 103856249 A 6/2014
(Continued)

OTHER PUBLICATIONS

European Search Report issued in corresponding European Application No. 17773984.4 dated May 29, 2019.
(Continued)

*Primary Examiner* — Abu S Sholeman
(74) *Attorney, Agent, or Firm* — Venable LLP

(57) ABSTRACT

User checking for execution of pairing of an information processing device and a communication device is executed with an appropriate condition. On the basis of advertise information transmitted from a printer as the communication device, it is determined whether the printer is registered in the information processing device. In a case where the printer is a registered printer that is registered in the information processing device, it is checked with a user whether to execute the pairing. A predetermined process for pairing of communication between the printer and the information processing device is executed in a case where the execution of the pairing is directed by the user or in a case where the printer is the registered printer that is registered in the information processing device.

18 Claims, 29 Drawing Sheets

(51) Int. Cl.
*H04W 8/00* (2009.01)
*H04W 76/10* (2018.01)
*H04W 4/80* (2018.01)
*H04W 8/02* (2009.01)
*H04W 84/12* (2009.01)

(52) U.S. Cl.
CPC ....... *H04W 12/0608* (2019.01); *H04W 76/10* (2018.02); *H04W 8/02* (2013.01); *H04W 84/12* (2013.01)

(56) References Cited

U.S. PATENT DOCUMENTS

| | | | |
|---|---|---|---|
| 2015/0382150 A1 | 12/2015 | Ansermet | |
| 2016/0080536 A1 | 3/2016 | Norota | |
| 2016/0085489 A1* | 3/2016 | Hansen | G06F 3/1204 358/1.15 |
| 2016/0227353 A1* | 8/2016 | Sueyoshi | G06Q 20/352 |
| 2016/0360345 A1* | 12/2016 | Kim | H04W 76/14 |

FOREIGN PATENT DOCUMENTS

| | | |
|---|---|---|
| JP | 2006121375 A | 5/2006 |
| JP | 2011248716 A | 12/2011 |
| JP | 2014110637 | 6/2014 |
| JP | 2015125508 A | 7/2015 |
| JP | 2015-154206 A | 8/2015 |
| JP | 2015154205 A | 8/2015 |
| JP | 2015154206 | 8/2015 |
| JP | 2015167318 | 9/2015 |
| JP | 201634090 | 3/2016 |
| JP | 2016031668 A | 3/2016 |
| KR | 10-2014-0074154 A | 6/2014 |
| KR | 10-2016-0028368 A | 3/2016 |

OTHER PUBLICATIONS

Korean Office Action dated Oct. 14, 2019 issued in corresponding Korean Application No. 10-2018-7022092.
Li Zheng, Bluetooth LE Nyumon, 1st edition, Shuwa System Co., Ltd., Kazukuni Saito, Jul. 1, 2014 (Jul. 1, 2014) (Issued date), p. 171.
International Search Report issued in parent International Application No. PCT/JP2017/007481 dated May 16, 2017.
Japanese Office Action issued in corresponding Japanese Application No. 2017243020 dated Jan. 8, 2019.
Chinese Office Action issued in corresponding Chinese Application No. 201780009285.7 dated Mar. 4, 2020.
Korean Office Action issued in corresponding Korean Application No. 10-2018-7022092 dated Apr. 20, 2020.
European Office Action issued in corresponding European Patent Application No. 17773984.4 dated Apr. 22, 2020.

* cited by examiner

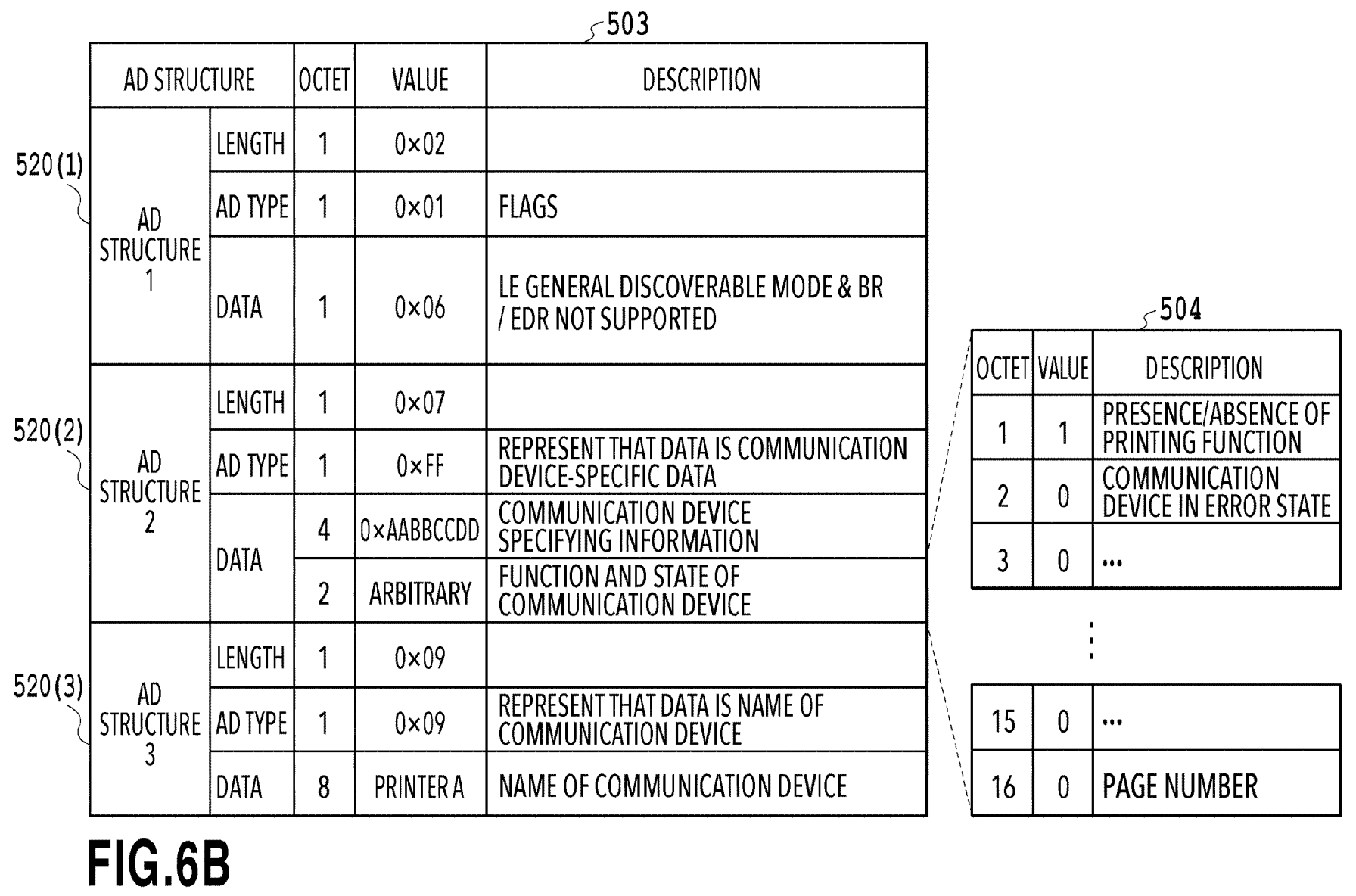

| | 504 |
|---|---|
| OCTET | VALUE | DESCRIPTION |
| 1 | 1 | PRESENCE/ABSENCE OF PRINTING FUNCTION |
| 2 | 0 | COMMUNICATION DEVICE IN ERROR STATE |
| 3 | 0 | ... |
| ... | ... | ... |
| 15 | 0 | ... |
| 16 | 0 | PAGE NUMBER |

503

| AD STRUCTURE | | OCTET | VALUE | DESCRIPTION |
|---|---|---|---|---|
| AD STRUCTURE 1 520(1) | LENGTH | 1 | 0x02 | |
| | AD TYPE | 1 | 0x01 | FLAGS |
| | DATA | 1 | 0x06 | LE GENERAL DISCOVERABLE MODE & BR / EDR NOT SUPPORTED |
| AD STRUCTURE 2 520(2) | LENGTH | 1 | 0x07 | |
| | AD TYPE | 1 | 0xFF | REPRESENT THAT DATA IS COMMUNICATION DEVICE-SPECIFIC DATA |
| | DATA | 4 | 0xAABBCCDD | COMMUNICATION DEVICE SPECIFYING INFORMATION |
| | | 2 | ARBITRARY | FUNCTION AND STATE OF COMMUNICATION DEVICE |
| AD STRUCTURE 3 520(3) | LENGTH | 1 | 0x09 | |
| | AD TYPE | 1 | 0x09 | REPRESENT THAT DATA IS NAME OF COMMUNICATION DEVICE |
| | DATA | 8 | PRINTER A | NAME OF COMMUNICATION DEVICE |

FIG.6B

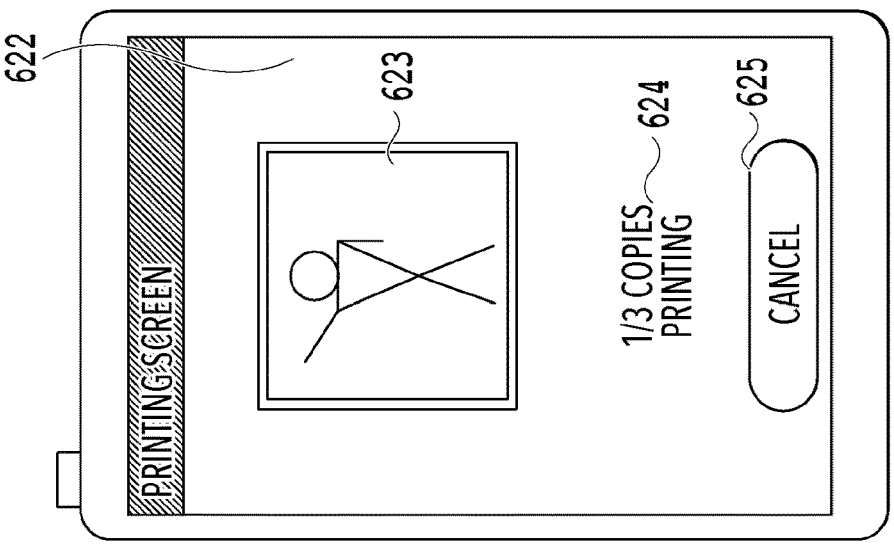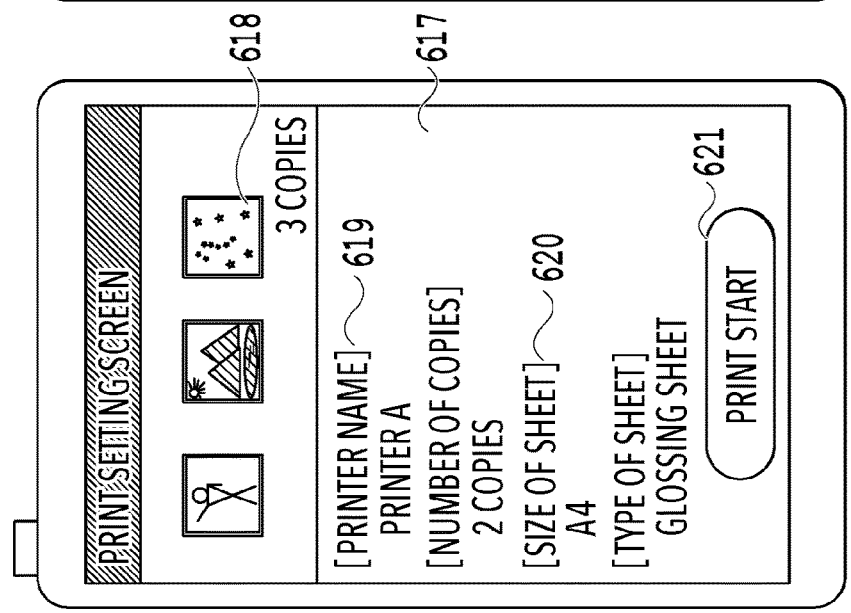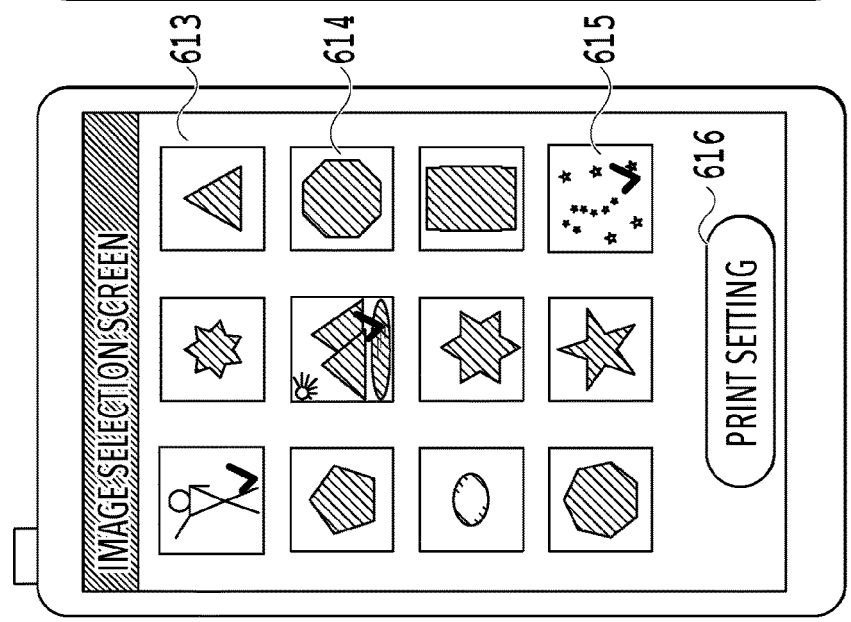

| OCTET | VALUE | DESCRIPTION |
|---|---|---|
| 1 | 1 | PRESENCE / ABSENCE OF PRINTING FUNCTION |
| 2 | 0 | ERROR STATE OF COMMUNICATION DEVICE |
| 3 | 1 | PRESENCE / ABSENCE OF HANDOVER FUNCTION |
| 4 | 1 | DORMANT STATE |
| 5 | 1 | LONG TIME REQUIRED FOR RECOVERY PROCESS |

⋮

| | | |
|---|---|---|
| 15 | 0 | ... |
| 16 | 0 | PAGE NUMBER |

FIG.17

| OCTET | VALUE | DESCRIPTION |
|---|---|---|
| 1 | 1 | PRESENCE / ABSENCE OF PRINTING FUNCTION |
| 2 | 0 | ERROR STATE OF COMMUNICATION DEVICE |
| 3 | 1 | PRESENCE / ABSENCE OF HANDOVER FUNCTION |
| 4 | 1 | DORMANT STATE |
| 5 | 1 | LONG TIME REQUIRED FOR RECOVERY PROCESS |
| 6 | 1 | ADVERTISE USED FOR SHORT DISTANCE |
| ⋮ | ⋮ | ⋮ |
| 15 | 0 | ... |
| 16 | 0 | PAGE NUMBER |

FIG.26

INFORMATION PROCESSING METHOD, STORAGE MEDIUM, AND INFORMATION PROCESSING DEVICE

CROSS-REFERENCE TO RELATED APPLICATIONS

This application is a Continuation of International Patent Application No. PCT/JP2017/007481, filed Feb. 27, 2017, which claims the benefit of Japanese Patent Application No. 2016-072752, filed Mar. 31, 2016, both of which are hereby incorporated by reference herein in their entirety.

BACKGROUND OF THE INVENTION

Technical Field

The present invention relates to an information processing method, a storage medium, and an information processing device executing communication pairing between devices.

Background Art

In communication pairing between devices, device information and the like are exchanged between such devices. Patent Literature 1 discloses a method of automatically establishing a communication connection between an imaging device and a portable device when pairing therebetween has been executed in advance and these devices become close to be at a distance in which electric waves reach.

CITATION LIST

Patent Literature

Patent Literature 1: Japanese Patent Laid-Open No. 2016-34090

SUMMARY OF THE INVENTION

However, in the method disclosed in Patent Literature 1, for example, in a case where pairing between a device A and a device B can be executed without confirmation from a user using the device A, also in a case where the user using the device A does not intend pairing with the device B, there is concern that the pairing is executed. In a case where the device A constantly checks the user whether or not pairing is necessary, the checking is requested also for a device with which pairing is recognized by the user.

The present invention relates to an information processing method, a storage medium, and an information processing device capable of performing user checking for the execution of pairing between the information processing device and a communication device with an appropriate condition.

Solution to Problem

An information processing method using an information processing device that can communicate with a communication device, the information processing method causing the information processing device to execute: a determination process in which whether the communication device is registered in the information processing device is determined on the basis of advertise information transmitted from the communication device; a checking process in which execution of pairing is checked by a user in a case where the communication device is not determined to be registered in the determination process; and an execution process in which a predetermined process for pairing of communication with the communication device is executed in a case where the execution of the pairing is directed by the user in the checking process or in a case where the communication device is determined to be registered in the determination process.

Advantageous Effects of Invention

According to the present invention, user checking for the execution of pairing between an information processing device and a communication device can be performed with an appropriate condition.

Further features of the present invention will become apparent from the following description of exemplary embodiments with reference to the attached drawings.

BRIEF DESCRIPTION OF THE DRAWINGS

FIG. 6B is an explanatory diagram of an advertise signal;

FIG. 8A is an explanatory diagram of a display screen of the information processing device at the time of a pairing process;

FIG. 8B is an explanatory diagram of a display screen of the information processing device at the time of a pairing process;

FIG. 8C is an explanatory diagram of a display screen of the information processing device at the time of a pairing process;

FIG. 17 is an explanatory diagram of information relating to the functions and the state of the communication device;

FIG. 26 is an explanatory diagram of information relating to the functions and the state of a communication device;

DESCRIPTION OF THE EMBODIMENTS

Hereinafter, embodiments of the present invention will be described as examples with reference to the drawings. Here, it is apparent that appropriate changes and modifications in the following embodiments on the basis of ordinary knowledge of a person skilled in the art in a range not departing from the gist of the present invention is understood as belonging to the present invention.

First Embodiment

An information processing device and a communication device included in a communication system according to this embodiment will be described. The information processing device is not limited only to a smartphone illustrated as an example in this embodiment, and various devices such as a portable terminal, a notebook PC, a tablet terminal, a personal digital assistant (PDA), and a digital camera are applicable. In addition, the communication device is not limited only to a printer (printing device) illustrated as an example in this embodiment, and various devices that can wirelessly communicate with the information processing device are applicable. For example, as the printer, an ink jet printer, a full-color laser beam printer, a monochrome printer, or the like is applicable. In addition, as the communication device, not only the printer but also a copying machine, a facsimile device, a portable terminal, a smartphone, a notebook PC, a tablet terminal, a PDA, a digital camera, a music reproduction device, a television set, or the like is applicable. Furthermore, a multifunction device having a plurality of functions such as a copying function, a FAX function, and a printing function is applicable.

Figure 1:
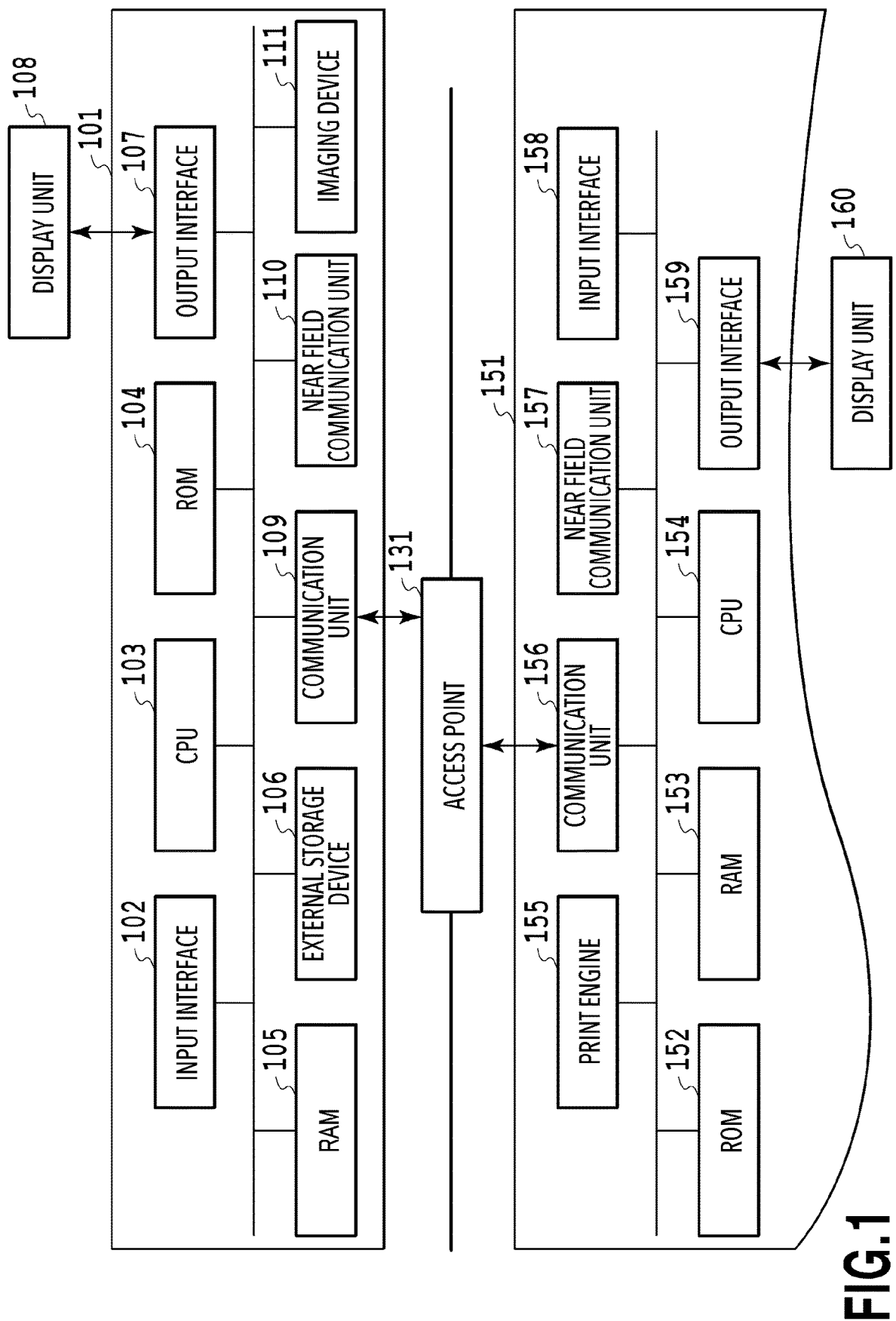
FIG. 1 is an explanatory diagram of an information processing device according to a first embodiment of the present invention and a communication device.

First, the configuration of an information processing device according to this embodiment and the configuration of a communication device that can communicate with the information processing device will be described with reference to a block diagram of FIG. 1. While the following configuration is described as an example in this embodiment, this embodiment can be applied to a device capable of communicating with a communication device, and the functions thereof are not limited to those illustrated in the drawing.

(Information Processing Device)

An information processing device 101 according to this embodiment includes an input interface 102, a CPU 103, a ROM 104, a RAM 105, an external storage device 106, an output interface 107, a display unit 108, a communication unit 109, a near field communication unit 110, an imaging device 111, and the like.

The input interface 102 is an interface used for receiving a data input and an operation direction from a user and is configured by a physical keyboard, buttons, a touch panel, or the like. This input interface 102 may be configured to be the same as the output interface 107 to be described later, and a form may be employed in which reception of an operation from a user and output of a screen are executed using the same configuration. The CPU 103 is a system control unit and controls the overall operation of the information processing device 101.

The ROM 104 stores fixed data such as a control program executed by the CPU 103, data tables, and an embedded operating system (hereinafter, referred to as an "OS") program. In this embodiment, each control program stored in the ROM 104 controls the execution of software such as scheduling, a task switch, and an interrupt process under the management of the embedded OS stored in the ROM 104. The RAM 105 is configured by a static random access memory (SRAM) requiring a backup power supply or the like. In addition, since data is maintained by a primary battery used for data backup, which is not illustrated in the drawing, the RAM 105 can store important data such as program control variables in a nonvolatile manner. Furthermore, a memory area in which setting information of the information processing device 101, management data of the information processing device 101, and the like are stored is also provided in the RAM 105. In addition, the RAM 105 is also used as a main memory and a work memory of the CPU 103.

The external storage device 106 stores various programs and various kinds of information used by such programs. As programs stored in the external storage device 106, there are an application providing a printing execution function (hereinafter, referred to as a "print application") and a printing information generating program generating printing information that can be analyzed by a communication device 151. In addition, there is an information transmission/reception control program used for transmitting/receiving information to/from the communication device 151 connected through the communication unit 109. In addition, the external storage device 106 also stores image data acquired from another information processing device and the Internet through the communication unit 109.

The output interface 107 is an interface executing control for displaying data using the display unit 108 and notification of the state of the information processing device 101. The display unit 108 is configured by a light emitting diode (LED), a liquid crystal display (LCD), or the like and displays data and gives a notification of the state of the information processing device 101. In addition, by installing a soft keyboard including keys such as numerical value input keys, a mode setting key, a determination key, a cancel key, and a power key on the display unit 108, an input from a user can be received through the display unit 108.

The communication unit 109 executes data communication with devices by being connected to the devices such as the communication device 151 and the like. For example, the communication unit 109 can be connected to an access point (not illustrated in the drawing) inside the communication device 151. By connecting the communication unit 109 and the access point inside the communication device 151, the information processing device 101 and the communication device 151 can communicate with each other. The communication unit 109 may directly communicate with the communication device 151 through radio communication or may communicate with the communication device 151 through an external access point (access point 131) present outside the information processing device 101 and the communication device 151. Examples of a radio communication system includes Wi-Fi (Wireless Fidelity) (registered trademark), Bluetooth (registered trademark), and the like. In addition, an example of the access point 131 includes a device such as a wireless LAN router. In this embodiment, a system in which the information processing device 101 and the communication device 151 are directly connected not through an external access point is referred to as a direct connection system. In addition, a system in which the information processing device 101 and the communication device 151 are connected through an external access point is referred to as an infrastructure connection system.

The near field communication unit 110 is configured to execute data communication by being wirelessly connected to a device such as the communication device 151 in a short distance and executes communication using a communication system different from that of the communication unit 109. The near field communication unit 110 can be connected to a near field communication unit 157 disposed inside the communication device 151. In this embodiment, as the communication system of the near field communication unit 110, Bluetooth Low Energy (BLE) is used.

The imaging device 111 is a device that converts an image captured using imaging elements into digital data. After stored in the RAM 105 once, the digital data is converted into a predetermined image format by a program executed by a CPU 103 and then is stored in the external storage device 106 as image data. The ROM 104 stores fixed data such as a control program executed by the CPU 103, data tables, and an OS program.

(Communication Device)

The communication device 151 according to this embodiment includes a ROM 152, a RAM 153, a CPU 154, a print engine 155, a communication unit 156, a near field communication unit 157, an input interface 158, an output interface 159, a display unit 160, and the like.

The communication unit 156, as an internal access point of the communication device 151, includes an access point used for a connection with a device such as the information processing device 101. This access point can be connected to the communication unit 109 of the information processing device 101. The communication unit 156 may directly communicate with the information processing device 101 through radio communication or may communicate with the information processing device 101 through the access point 131. Examples of the communication system includes Wi-Fi (registered trademark), Bluetooth (registered trademark), and the like. In addition, the communication unit 156 may include hardware functioning as an access point or may operate as an access point by using software causing the communication unit 156 to function as an access point. The near field communication unit 157 is configured to be wirelessly connected with a device such as the information processing device 101 in a short distance. In this embodiment, as the communication system of the near field communication unit 157, Bluetooth Low Energy (BLE) is used.

The RAM 153 is configured by a SRAM or the like requiring a backup power supply. The RAM 153 maintains data using a primary battery for data backup, which is not illustrated in the drawing, and thus can store important data such as program control variables in a nonvolatile manner. In addition, a memory area in which setting information of the communication device 151, management data of the communication device 151, and the like are stored is also provided in the RAM 153. Furthermore, the RAM 153 is used also as a main memory and a work memory of the CPU 154 and functions as a reception buffer used for temporarily storing printing information received from the information processing device 101 or the like and a storage memory of various kinds of information.

The ROM 152 stores fixed data such as a control program executed by the CPU 154, data tables, and an OS program, and the like. In this embodiment, each control program stored in the ROM 152 controls the execution of software such as scheduling, a task switch, and an interrupt process under the management of the embedded OS stored in the ROM 152. The CPU 154 is a system control unit and controls the overall operation of the communication device 151.

The print engine 155 prints an image on a printing medium such as a paper sheet using a printing material such as ink and outputs the printing result on the basis of information stored in the RAM 153 and a printing job received from the information processing device 101 or the like. The printing job transmitted from the information processing device 101 or the like has a large amount of transmission data and requires high-speed communication and thus is received through the communication unit 156 that can execute communication at a speed higher than that of the communication of the near field communication unit 157.

The input interface 158 is an interface used for receiving a data input and an operation direction from a user and is configured by a physical keyboard, buttons, a touch panel, and the like. By configuring this input interface 158 and the output interface 159 to be described later to be the same, a form may be employed in which an output of a screen and reception of an operation from a user are executed using the same configuration. The output interface 159 displays data using the display unit 160 and gives a notification of the state of the communication device 151 by controlling the display unit 160.

The display unit 160 is configured by a light emitting diode (LED), a liquid crystal display (LCD), or the like and displays data and gives the notification of the state of the communication device 151. In addition, by installing a soft keyboard including keys such as numerical value input keys, a mode setting key, a determination key, a cancel key, and a power key on the display unit 160, an input from a user can be received through the display unit 160.

In such a communication device 151, memories such as an externally-attached HDD and an SD card may be mounted as option devices, and information stored in the communication device 151 may be stored in such a memory. In addition, the process sharing between the information processing device 101 and the communication device 151 is not limited only to this embodiment and may have another form.

(Transmission of Advertise Information and Reception of BLE Connection Request)

Next, processes of a transmission of advertise information and a reception of a request for starting generic attribute profile (GATT) communication in the BLE standard will be described. In this embodiment, the near field communication unit 157 operates as a slave device, and the near field communication unit 157 executes such processes. The near field communication unit 157 divides a frequency band of 2.4 GHz into 40 channels (0 to 39 ch) and executes communication. The near field communication unit 157 uses 37th to 39th channels among such 40 channels for the transmission of advertise information and the reception of a BLE connection request and uses 0th to 36th channels for data communication after the BLE connection.

Figure 2:
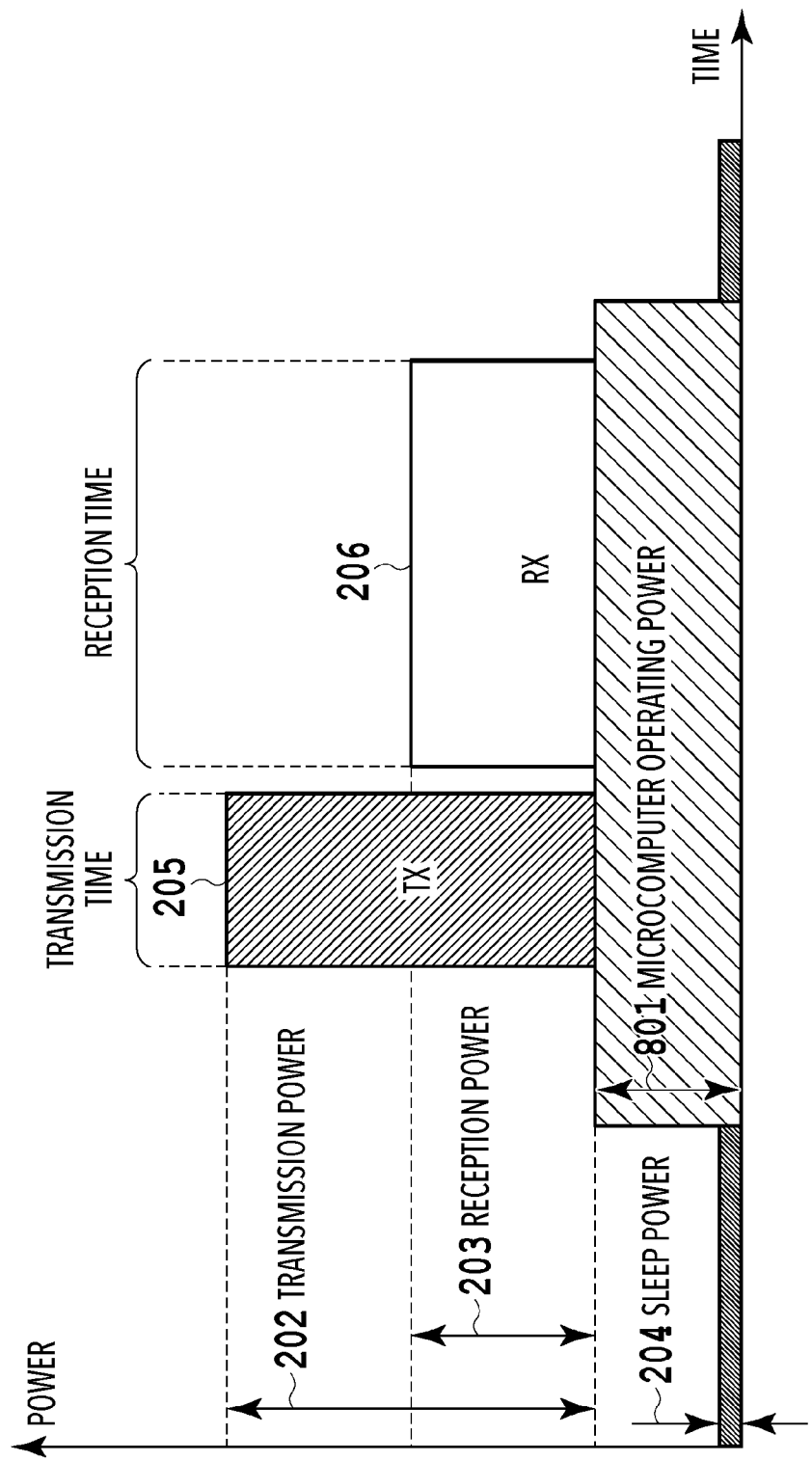
FIG. 2 is an explanatory diagram of a relation between a transmission/reception process of advertise information and power consumption.

FIG. 2 is an explanatory diagram of power consumption of each process when advertise information is transmitted using one channel, the vertical axis represents the power consumption of the near field communication unit 157, and the horizontal axis represents the time. Here, power Tx 205 is total power consumption of a process (transmission process) for broadcasting advertise information, and power Rx 206 is total power consumption of a process (reception process) for activating a receiver for receiving a BLE connection request. In addition, transmission power 202 is instantaneous power consumption according to the transmission process, and reception power 203 is instantaneous power consumption according to the reception process. Microcomputer operating power 201 is instantaneous power consumption of a case where a microcomputer inside the near field communication unit 157 is operated. The reason for operating the microcomputer also before and after the consumption of the power Tx 205 and the power Rx 206 and therebetween is that the microcomputer needs to be operated in advance for the execution and stop of the transmission process and the reception process. In a case where advertise information is transmitted using a plurality of channels, the power consumption increases in accordance with the number of channels in which the advertise information is transmitted. While the microcomputer is not operated, and the near field communication unit 157 is in a power save state, sleep power 204 is instantaneous power consumption of the near field communication unit 157. In this way, the near field communication unit 157, after executing the transmission process using a predetermined channel, executes the reception process for a predetermined time using the same channel, thereby waiting for the transmission of a BLE connection request from the information processing device 101.

Figure 3:
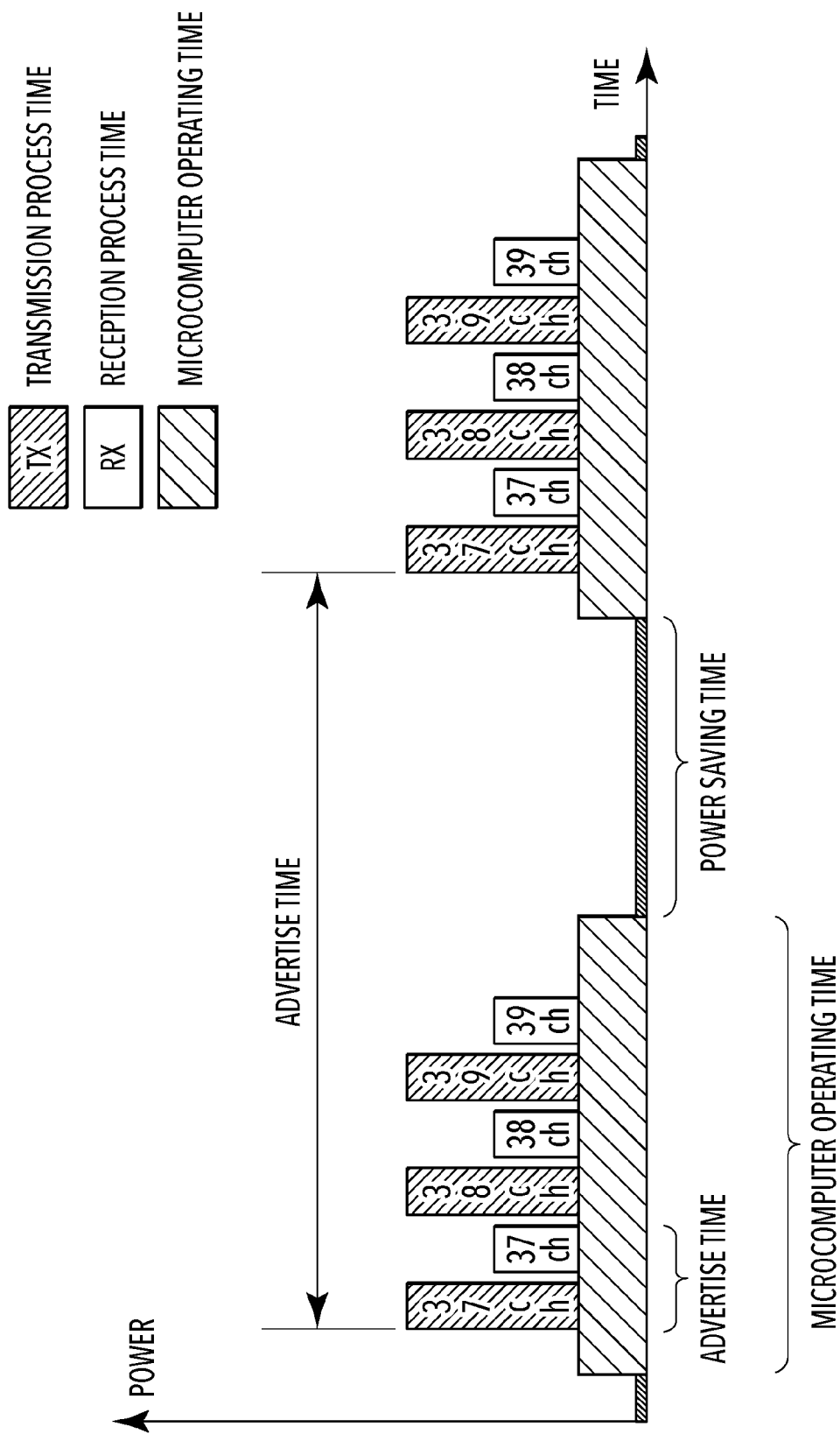
FIG. 3 is an explanatory diagram of advertise in BLE.

The near field communication unit 157, as illustrated in FIG. 3, after repeating the transmission process and the reception process of the advertise information three times of each of the channels (37 to 39 ch), stops the operation of the microcomputer and is in a power saving state for a predetermined time. Hereinafter, a combination of the transmission process and the reception process of the advertise information using a predetermined channel will be referred to as an advertise. In addition, a time interval at which the advertise information is transmitted using a predetermined channel will be referred to as an advertise interval. The number of times of advertise repeated until the state becomes the power saving state after executing the advertise of the first time may be arbitrary changed to be three or less.

(Pairing)

In this embodiment, by executing authentication between the information processing device 101 and the communication device 151, a pairing process for executing reading and writing data through generic attribute profile (GATT) communication between devices is executed. The GATT is a profile taking charge of reading and writing (transmission/reception) of information in the BLE standard. The GATT communication is a communication in which the information processing device 101 is responsible for the role of a GATT client, the communication device 151 is responsible for the role of a GATT server, and information is read or written from the information processing device 101 to the communication device 151 in accordance with the profile of the GATT base. In a state in which pairing is not executed between the information processing device 101 and the communication device 151, the communication device 151 does not permit reading/writing information using the GATT communication. In this way, it can be suppressed that the communication is executed between the information processing device 101 and the communication device 151 that have not executed pairing communicate with each other, and, for example, information stored by the communication device 151 is carelessly acquired by the information processing device 101 that has not executed pairing.

Details of the pairing process will now be described. First, in a case where a print application to be described later is operated, and an initial screen (home screen) displayed by the print application is displayed on the display unit 108, the information processing device 101 starts a search for advertise information having specific device information. The specific device information, for example, is a UUID, a MAC address, or the like of a device (a printer or the like) corresponding to a print application. Then, when advertise information having the specific device information is received, the information processing device 101 transmits a BLE connection request (CONNECT_REQ) to a device (here, the communication device 151) that has transmitted the advertise information and establishes a BLE connection between the device. Then, in a case where pairing with the communication device 151 is not completed, the information processing device 101 displays a screen used for urging the user to execute pairing on the display unit 108. Then, in a case where the execution of pairing is directed by a user, the information processing device 101 transmits a pairing request to the communication device 151 through communication using a security manager protocol. In addition, until pairing ends, communication between the devices is executed using the security manager protocol.

In this embodiment, as an authentication method for the pairing, PIN code authentication is executed. The PIN code authentication is an authentication method in which transmission/reception is permitted only in a case where a text determined in advance match on both sides for limiting the transmission/reception of information to a specific user. The PIN code authentication according to this embodiment will be described with reference to FIG. 4.

Figure 4:
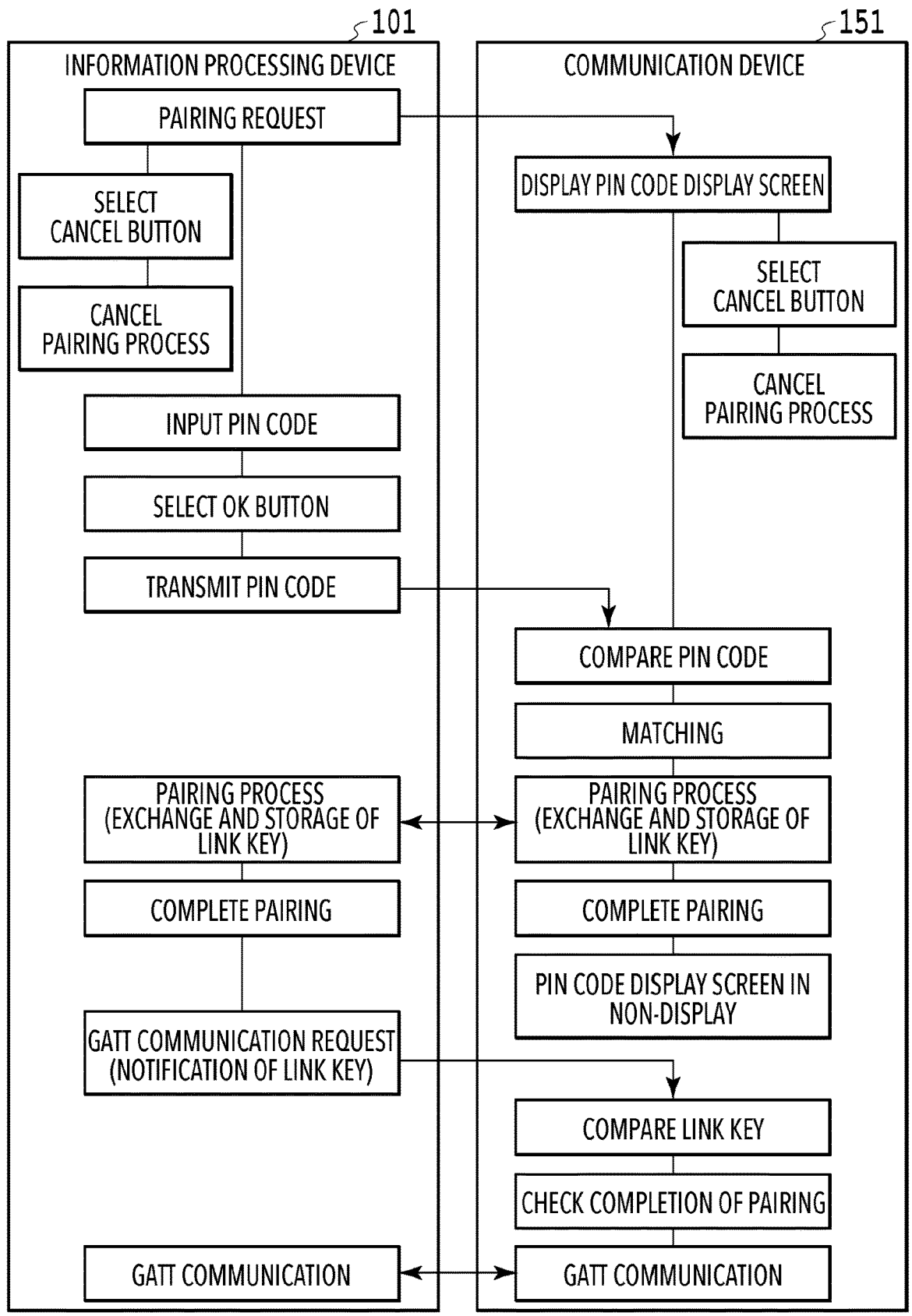
FIG. 4 is an explanatory diagram of a pairing process between the information processing device and the communication device.

FIG. 4 is a sequence diagram for describing the pairing process using PIN code authentication between the information processing device 101 and the communication device 151.

Figure 5B:
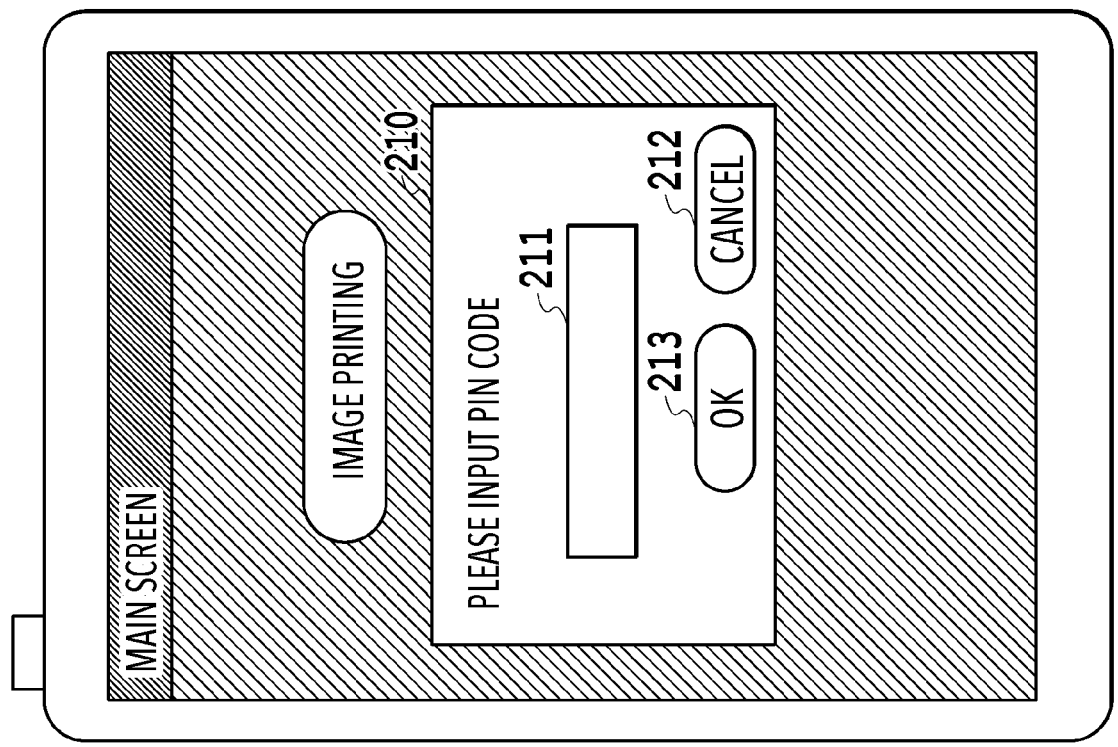
FIG. 5B is an explanatory diagram of a display screen of the information processing device.
Figure 5A:
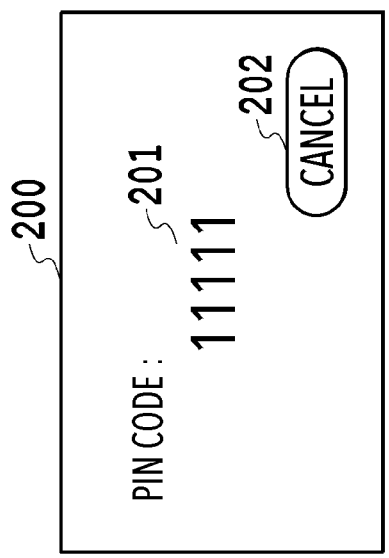
FIG. 5A is an explanatory diagram of a display screen of the communication device.

First, the information processing device 101 requests pairing for the communication device 151, whereby the pairing process is started. When the request for pairing is received, the communication device 151 displays a PIN code display screen 200 as illustrated in FIG. 5A on the display unit 160 (see FIG. 1). On the PIN code display screen 200, a PIN code (authentication information) 201 is displayed, and when a cancel button 202 is selected, the pairing process is canceled. In the information processing device 101, the PIN code input screen 210 is displayed as illustrated in FIG. 5B on the display unit 108 (see FIG. 1), and, when the cancel button 212 is selected, the pairing process is canceled.

As a user inputs the PIN code 201 to a PIN code input area 211 of the PIN code input screen 210 and selects an OK button 213, the information processing device 101 transmits the input PIN code to the communication device 151. The communication device 151 determines whether or not the PIN code received from the information processing device 101 and the PIN code 201 displayed on the PIN code display screen 200 illustrated in FIG. 5A match each other. In a case where these codes match each other, the pairing process is executed. In this example, the pairing process is a pairing process using a security manger protocol (SMP) of BLE and exchanges link keys generated using a predetermined method on the basis of the PIN code described above. The exchanged link keys are stored in the external storage device 106 of the information processing device 101 and the ROM 152 of the communication device 151. When the pairing is completed in this way, the PIN code display screen 200 of the communication device 151 automatically becomes non-display and transitions to the original screen.

After the completion of the pairing, GATT communication is started. In other words, when GATT communication is requested for the communication device 151, the information processing device 101 gives a notification of the link key stored in the information processing device 101. When the GATT communication request is received, the communication device 151 compares the link key stored in the storage area inside the communication device 151 at the time of executing the pairing process with the link key notified from the information processing device 101. Then, on the basis of a result of the comparison, it is checked whether or not a device (information processing device 101) that has transmitted the GATT communication request is a device that has completed to be paired. In a case where the information processing device 101 is a device that has completed to be paired, reading/writing of information through GATT communication is started between the communication device 151 and the information processing device 101. In this way, in a case where the information processing device 101 has completed the pairing process with the communication device 151 once, thereafter, the information processing device 101 can execute GATT communication with the communication device 151 without user's input of the PIN code.

In addition, in the description presented above, while a form in which the PIN code 201 displayed on the PIN code input screen 210 is input by a user to the PIN code input area 211 has been described, the form is not limited thereto. For example, a form may be employed in which the PIN code 201 is notified to the communication device 151 without a user's input by setting the PIN code 201 as fixed information (which cannot be arbitrarily changed by a user) and configuring the PIN code 201 as being stored in the information processing device 101 together with the installation of a print application. In addition, a timing at which the pairing process is started is not limited to that of the form described above and, for example, may be a timing at which a user directs printing through the print application, a timing at which before a BLE connection in a connection setting process, or the like. In addition, for example, pairing may be executed without the PIN code. In such a case, data of the GATT communication is encrypted. By displaying or inputting an encryption key instead of the PIN code described above, communication that can be decrypted by only a user who can check the display content of the display unit 160 of the communication device 151 can be realized.

(Information of Advertise)

Figure 6A:
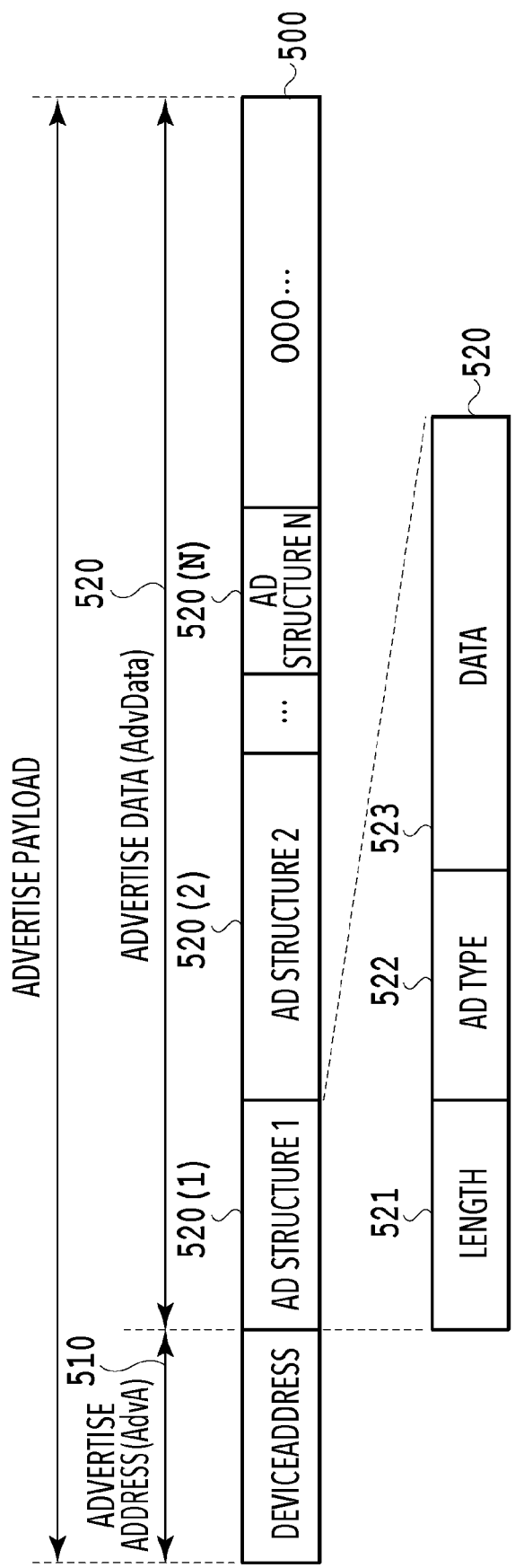
FIG. 6A is an explanatory diagram of an advertise signal.

FIG. 6A is a diagram illustrating a payload part of an advertise signal. The advertise payload 500 is configured by an advertise address (denoted by "AdvA" in the drawing) 510 and an advertise data (denoted by "AdvData" in the drawing) 520. In this embodiment, the advertise address 510 is information that is uniquely assigned to the communication device 151. The advertise data 520 includes a plurality of advertise structure areas (in the drawing, denoted by "AD_Structure 1, 2, . . . , N") 520(1), 520(2), . . . , 520(N), and is padded with "0" in a case where such areas do not reach a predetermined capacity. Each of the advertise structure areas 520 (520(1), 520(2), . . . , 520(N)) includes storage areas of a data length 521, an advertise type 522, and actual data 523. In FIG. 6A, the data length 521 is denoted by "Length", the advertise type 522 is denoted by "AD Type", and the actual data 523 is denoted by "Data".

FIG. 6B is an explanatory diagram of data 503 stored in the advertise structure area 520 according to this embodiment. In the drawing, data is stored in three advertise structure areas (in the drawing, denoted by "AD Structure1", "AD Structure2", and "AD Structure3") 520(1), 520(2), and 520(3). The data of the advertise structure area 520(1) has a data format of BLE, and thus, description thereof will be omitted.

In the advertise structure area 520(2), unique information of the communication device 151 is stored. As the data length (Length) of the area 520(2) of this example, it is represented that the data length of the advertise type (AD Type) and the actual data (Data) is 7 octets (here, 1 octet represents 8 bits). The advertise type represents the meaning of information included in the actual data, and "0xFF" of this example represents that the actual data is unique information of the communication device 151. As the actual data, specifying information and information of a function and a state are stored. As a specific example of the specifying information of the communication device 151, there is information used for identifying a manufacturing company of the communication device and the use of the communication device (for example, for home use or for office use). As actual data, further information of the function and the state of the communication device is stored. The information 504 relating to the function and the state of the communication device is stored in a byte array. In this example, information relating to whether or not the communication device has a printing function is set in the area of the first octet. In a case where the printing function is included, the value is "1". On the other hand, in a case where the printing function is not included, the value is "0". In the case of this example, the communication device 151 has the print engine 155 (see FIG. 1), the value of the first octet is "1". In addition, the value of the second octet is "1" in a case where an error has occurred in the communication device 151 and is "0" in a case where no error has occurred. For example, in a case where ink runs out during a printing operation using the print engine 155, the replacement of an ink tank is necessary, and a standby state of a printing operation is formed until the ink tank is replaced. In such a case, the value of the second octet is "1". In the area of the 16th octet, a page number is stored. In the drawing, the value of the 16th octet is "0", and, in a case where the value is "1", another information is stored in another octet. For example, in the case of the page number "0", as described above, information relating to the presence/absence of a printing function is stored in the area of the first octet. On the other hand, in the case of the page number "1", different information can be stored in the area of the first octet. Accordingly, even in a case where there is a limit on the size of advertise that can be stored in information, by changing the page number, different information can be transmitted.

The content of the data stored in the advertise structure area and the structure of data are not limited to those of the example described above. For example, as a number that can be used for uniquely identifying a combination of information relating to the manufacturing company, the function, and the state of the communication device, a universally unique identifier (UUID) is defined in advance. Then, the advertise may be executed as the communication device 151 selects a UUID in accordance with the state and the like and stores the UUID in the advertise structure area. In this example, by defining a plurality of UUID using a combination, accidental coincidence (collision phenomenon) with a UUID included in advertise information transmitted by another communication device is avoided. In a case where such a collision phenomenon occurs, a malfunction occurs as the information processing device 101 processes the advertise of another communication device.

In the advertise structure area 520(3), the name of the communication device 151 is stored. The name of a communication device is different for each device and thus is variable. The data length (Length) of the area 520(3) of this example represents that the data length of the advertise type (AD type) and the actual data (Data) is 9 octets. The advertise type represents the meaning of information included in the actual data, and "0x09" of this example represents that the actual data is the name of the communication device 151. The actual data corresponds to the name of the communication device 151 and, in this example, the name is "Printer A".

The advertise signal according to the communication device 151 is assumed to be normally transmitted as illustrated in FIG. 3. The data of an advertise signal, as described above, is changed according to the state of the communication device 151. The transmission of an advertise signal is not limited to the normal transmission which is the case of this example. For example, an advertise signal may be configured to be transmitted only in a case where a specific condition is satisfied at the time of a user's operation performed through the input interface 158 of the communication device 151 or the like.

(Print Application)

Next, a timing at which a pairing process is executed will be described. In this example, when a transition to a specific screen of the print application is made, the pairing process is executed. First, the screen of the print application will be described.

In accordance with reception of a direction, from the user through the input interface 102, for starting the operation of an application providing a print execution function stored in the external storage device 106, the information processing device 101 starts the operation of the print application. Hereinafter, the communication device 151 will be represented as a printer.

Figure 7C:
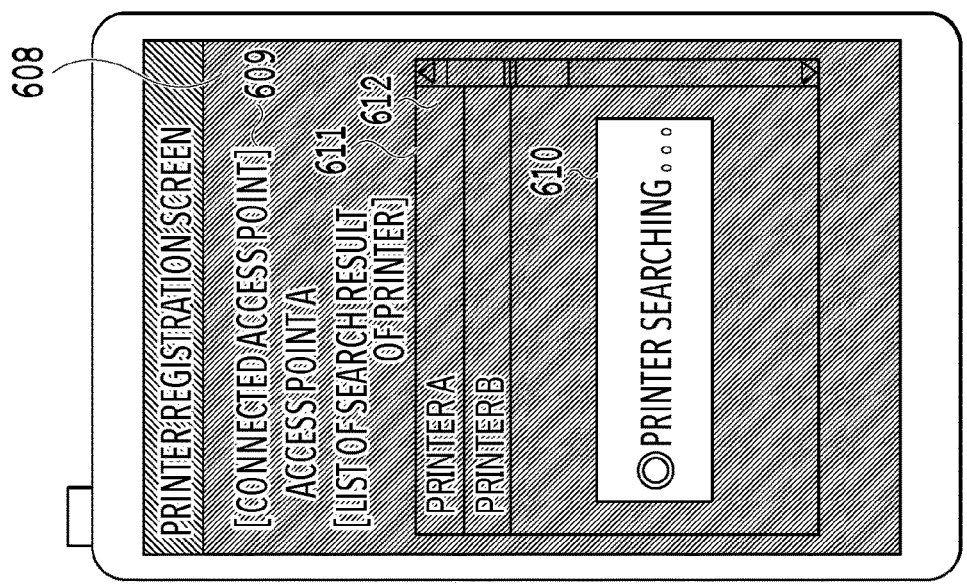
FIG. 7C is an explanatory diagram of a display screen of the information processing device at the time of a pairing process.
Figure 7B:
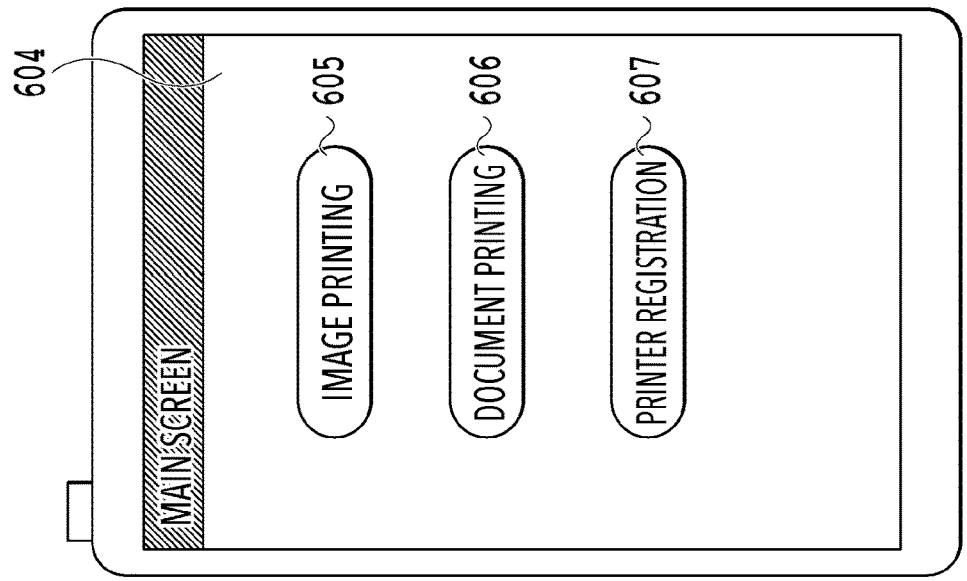
FIG. 7B is an explanatory diagram of a display screen of the information processing device at the time of a pairing process.
Figure 7A:
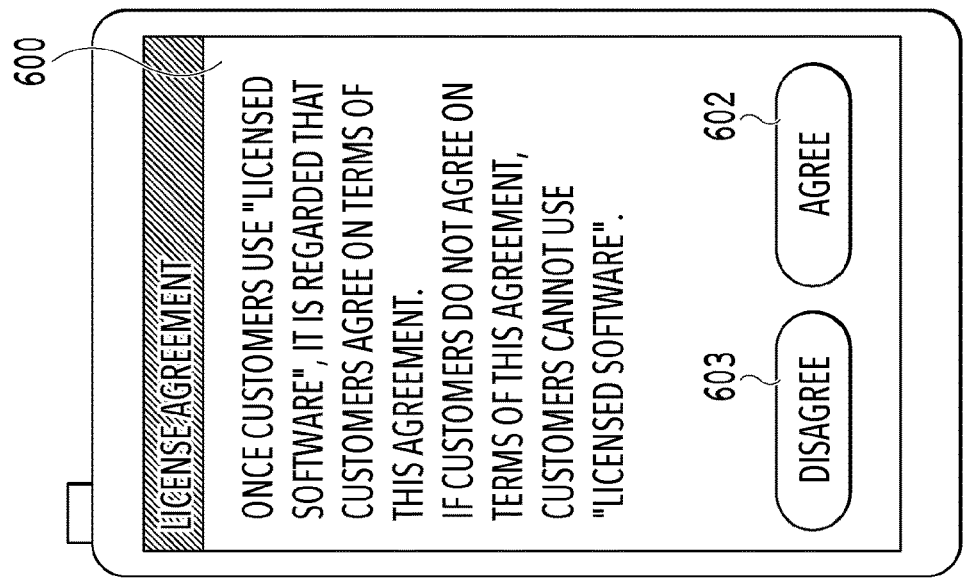
FIG. 7A is an explanatory diagram of a display screen of the information processing device at the time of a pairing process.

FIGS. 7A, 7B, and 7C and FIGS. 8A, 8B, and 8C are explanatory diagrams of transitions of a print application screen that is displayed for the user by the print application through the display unit 108. A license agreement screen 600 illustrated in FIG. 7A is a screen used for allowing a user to checking conditions to be observed when the print application is used. The user checks a license agreement text 601 and selects agreement or disagreement thereon. In the case of disagreement, in accordance with selection of a button 603, the print application ends. On the other hand, in the case of disagreement, in accordance with selection of a button 602, the screen is transitioned to a main screen 604 illustrated in FIG. 7B. The main screen 604 displays main functions of the print application in a list. In a case where a printing target stored in the external storage device 106 of the information processing device 101 or the like is image data, a button 605 is selected. In accordance with the selection of the button 605, the screen is transitioned to an image selection screen 613 illustrated in FIG. 8A. On the other hand, in a case where a printing target is text data, a button 606 illustrated in FIG. 7B is selected. In accordance with the selection of the button 606, the screen is transitioned to a document selection screen that is not illustrated in the drawing.

In accordance with selection of a printer registration button 607 illustrated in FIG. 7B, the print application executes the process of a search (specifying) and registration of a printer. In the print application, in order to specify a printer within a radio communication network, information specifying a printer, function information of a printer, and the like can be registered. Examples of the information specifying the printer includes identification information (MAC address) of the printer, an IP address, the name of the printer, and the like. In addition, examples of the functional information of the printer include information relating to the capability of the printer such as a list of printable sheets and the like. By executing the process of registering the specifying information and the function information, the print application stores the specifying information and the function information in the external storage device 106 in association each other. Hereinafter, a printer for which such a registration process has been executed will be referred to as "registered printer", and a printer executing a printing process will be referred to as a "current printer". In addition, a plurality of printers can be registered. In such a case, a user selects a current printer among registered printers before executing a printing process. In a case where there is one registered printer, the printer becomes the current printer. In a case where a printer is registered, the printer registration button 607 illustrated in FIG. 7B is selected. In accordance with selection of the printer registration button 607, the screen is transitioned to a printer registration screen 608 illustrated in FIG. 7C.

The print application, after the transition to the printer registration screen 608, automatically searches for printers connected within a radio communication network (for example, a wireless LAN) through an access point that is connected using the communication unit 109 and displays found printers in the form of a list. In this example, the display is executed using the names of the printers included in the specifying information. A user selects a printer desired to be registered among a printer group listed up on the printer registration screen 608, whereby a registered printer is determined. It is apparent that a plurality of registered printers can be selected.

In the printer registration screen 608 illustrated in FIG. 7C, as an access point name 609, a service set identifier (SSID) of the access point 131 to which the printer is currently connected is displayed. Here, a simplified access point A is used. A modal dialog 610 displays a dialog that clearly represents an executing process. During the display of the dialog 610, the other display areas are darkened, and a state is formed in which operations such as selection of a button within the area and the like cannot be executed. When the search ends, the dialog 610 is in a non-display state, and the other areas are brightened, and operations such as selection of a button within the area and the like can be executed. A search result of printers is displayed in a search result list 611. In the example illustrated in the drawing, two printers (Printer A and Printer B) that have been retrieved are displayed. As a user selects a printer that is listed up, the selected printer becomes a registered printer, and the screen is transitioned to the main screen 604 illustrated in FIG. 7B.

In this example, a case where only one printer can be selected as a registered printer will be described. For this reason, the selected printer becomes the current printer. In addition, the printer identification information, the IP address, the printer name, and the like of the registered printer are stored in the external storage device 106.

In accordance with selection of the image print button 605 of the main screen 604, the screen is transitioned to the image selection screen 613 illustrated in FIG. 8A. On the image selection screen 613, thumbnail images 614 of image data stored in the external storage device 106 of the information processing device 101 are displayed, and, as a user selects a thumbnail image 614, an image that is a printing target is selected. On a thumbnail image corresponding to a selected image that is a printing target, a check mark 615 representing being a printing target is displayed. By selecting a print setting button 616 after the selection of the image that is the printing target, the screen is transitioned to a print setting screen 617 illustrated in FIG. 8B.

In a thumbnail display area 618 of the print setting screen 617, a thumbnail image of a printing target image is displayed. An image that is a printing target corresponds to a thumbnail image to which the check mark 615 has been attached on the image selection screen 613 illustrated in FIG. 8A. In a printer name display area 619, the printer name of the current printer is displayed. As the printer name, a name included in the communication device specifying information stored in association with the current printer is displayed. In addition, in a case where there are a plurality of registered printers, the name of a registered printer that has been selected by the user through a printer selection screen not illustrated in the drawing or the like is displayed as the current printer. In a print condition display area 620, a print condition at the time of executing printing is displayed. A user can appropriately change the print condition by using a print condition change screen that is not illustrated in the drawing. In order to direct print starting to the print application, the user selects a print start button 621. Accordingly, the screen is transitioned to a middle-of-print screen 622 illustrated in FIG. 8C.

After the transition to the middle-of-print screen 622, the print application transmits a direction for executing a printing process for the printing target image selected by the user using the print condition displayed in the print condition display area 620 to the current printer (in this example, the printer A). A printing image 623 on the middle-of-print screen 622 displays an image that is current in the middle of printing among printing target images. In a message 624, the progress and the status of printing are displayed. In a case where printing cannot be continued or stopped due to the occurrence of a certain problem, the state is displayed in the message 624 to deliver the state to the user. In a case where a cancel button 625 is selected, printing is stopped, and the screen is transitioned to the print setting screen 617, which is illustrated in FIG. 8B as the previous screen.

(Timing of Pairing)

Figure 9:
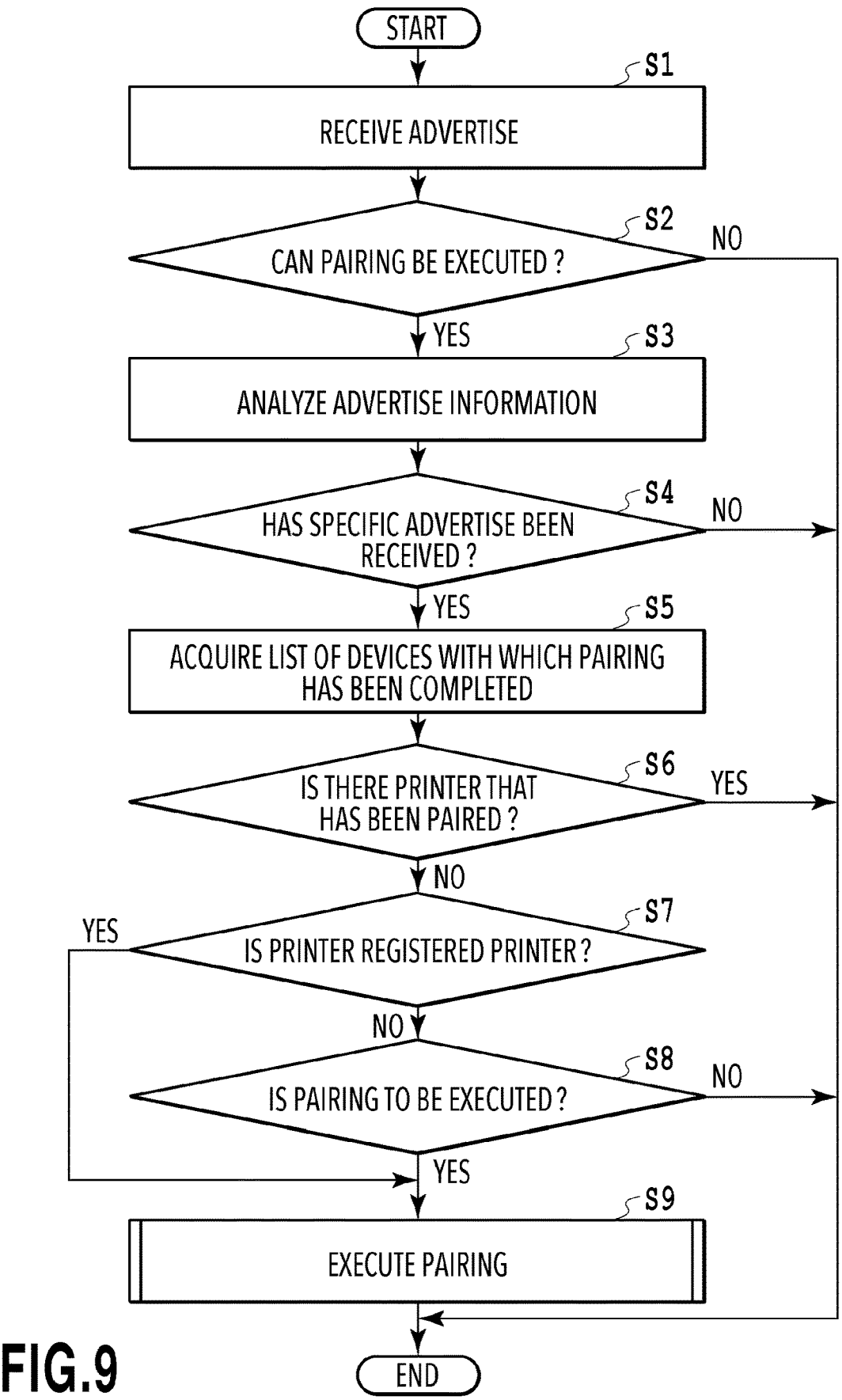
FIG. 9 is a flowchart for describing a pairing process.

FIG. 9 is a flowchart for describing a pairing process executed by the print application. This pairing process is executed immediately after the start of the operation of the print application.

First, the information processing device 101 receives an advertise signal transmitted by a printer (Step S1), and the reception of the advertise signal is notified from the OS to the print application. At that time, information 500 (see FIGS. 6A and 6B) stores in the advertise signal is also delivered from the OS to the print application. When the reception of the advertise signal is notified, the print application checks whether or not pairing can be executed (Step S2).

Such a checking process will be described using the screens of the print application illustrated in FIGS. 7A, 7B, and 7C, and FIGS. 8A, 8B, and 8C. In the middle of displaying such screens, the state is a state in which the print application requests checking to the user or a state in which a certain process is in the middle of execution. In such cases, pairing is not executed. More specifically, when the license agreement screen 600 illustrated in FIG. 7A is in the middle of display, the use of the print application is not permitted until the user agrees to the license agreement, and accordingly, even when the advertise signal is received, the pairing process is not executed. In addition, in this example, the printer searching process is executed in the middle of displaying the printer registration screen 608 illustrated in FIG. 7C. In a case where the pairing process is executed when the modal dialog 610 is displayed in the middle of the printer search, a plurality of dialogs are displayed, and an operation requested to the user is complex, and accordingly, the pairing process is not executed. However, when the printer search ends, and the modal dialog 610 is in the non-display state, it is determined that the pairing process can be executed. In a case where it is determined that the pairing process can be executed, the received advertise information is analyzed (Step S3). More specifically, the data 503 stored in the advertise structure area 520 is analyzed. When the analysis of the advertise information ends, it is determined whether the advertise is a specific advertise that can be processed by the print application (Step S4).

In this example, by using the communication device specifying information illustrated in FIG. 6B described above, it is determined whether or not the advertise can be processed by the print application, in other words, whether or not the pairing process can be executed. The communication device specifying information is information that specifies the communication device such as a manufacturing company, the use of the communication device (for example, a home use or an office use), and the like. In Step S4, for example, it is determined that the pairing process can be executed under a condition that the information relating to the manufacturing company included in the communication device specifying information is specific information. In addition, in a case where the print application is an application corresponding to a home printer, when information representing that the printer is for the office use is stored as the communication device specifying information, it is determined that the pairing process cannot be executed. In such a case, when information representing that the printer is for the home use is stored as the communication device specifying information, it is determined that the pairing process can be executed. In addition, it may be determined that the pairing process can be executed under the condition that the information relating to the manufacturing company included in the communication device specifying information is specific information, and information representing the printer is for the home use is included in the communication device specifying information.

In this example, it is determined whether or not the pairing process can be executed on the basis of the communication device specifying information. However, the condition is not limited thereto, and, for example, it may be determined that the pairing process can be executed only for printers having specific names with which the print application is compatible on the basis of the communication device name of the advertise information. In addition, it may be determined whether or not the pairing process can be executed on the basis of the information 504 relating to the function and the state of the communication device. For example, in a case where a printing function is not included in the communication device, the print application does not execute the pairing process. Furthermore, in a case where the printer is in an error state, and an application handling error information of the printer is installed in the information processing device 101, the print application may guide the user to the application handling the error information without executing the pairing process.

In a case where it is determined that the advertise can be processed by the print application, the process proceeds from Step S4 to Step S5, and the information processing device 101 acquires a list of communication devices that were paired in the past. In addition, in a case where a link keys is exchanged in the pairing process, the print application stores the communication device specifying information and the link key in the external storage device 106 in association with each other. In Step S5, a list of the communication device specifying information that is stored in association with a link key in this way is acquired.

Thereafter, it is checked whether or not the current state is a state in which pairing of the information processing device 101 and the communication device 151 has been completed. For example, it is checked whether or not the name of the communication device of the communication device specifying information included in the received advertise signal is included in the names of communication devices included in the communication device specifying information of the list. In a case where the name is included, it can be determined that the pairing has been completed, in other words, a link key of the communication device transmitting the advertise signal has already been stored in the external storage device 106. In a case of the state in which the pairing has already been completed, the flow illustrated in FIG. 9 ends. In addition, by checking the state in which the pairing has been completed in Step S6, unnecessary display and checking of a checking dialog 800 to be described later can be prevented.

In a case where the pairing has not been completed, the process proceeds from Step S6 to Step S7, and it is checked whether or not the printer transmitting the advertise is the registered printer described above. More specifically, it is determined whether or not the name of the communication device of the communication device specifying information included in the advertise signal corresponds to the name of the registered printer that is stored in the external storage device 106. In a case where the printer transmitting the advertise is the registered printer, the pairing process (Step S9) is executed without checking (Step S8) whether or not the pairing to be described later is executed. The registered printer is a printer that has established a connection with the information processing device using a wireless LAN and is a printer approved to be used by the user in accordance with the print application, and accordingly, the checking whether or not pairing is executed (pairing execution checking) does not need to be performed. Accordingly, unnecessary pairing execution checking does not need to be performed, and accordingly, user's effort can be reduced.

Figure 10:
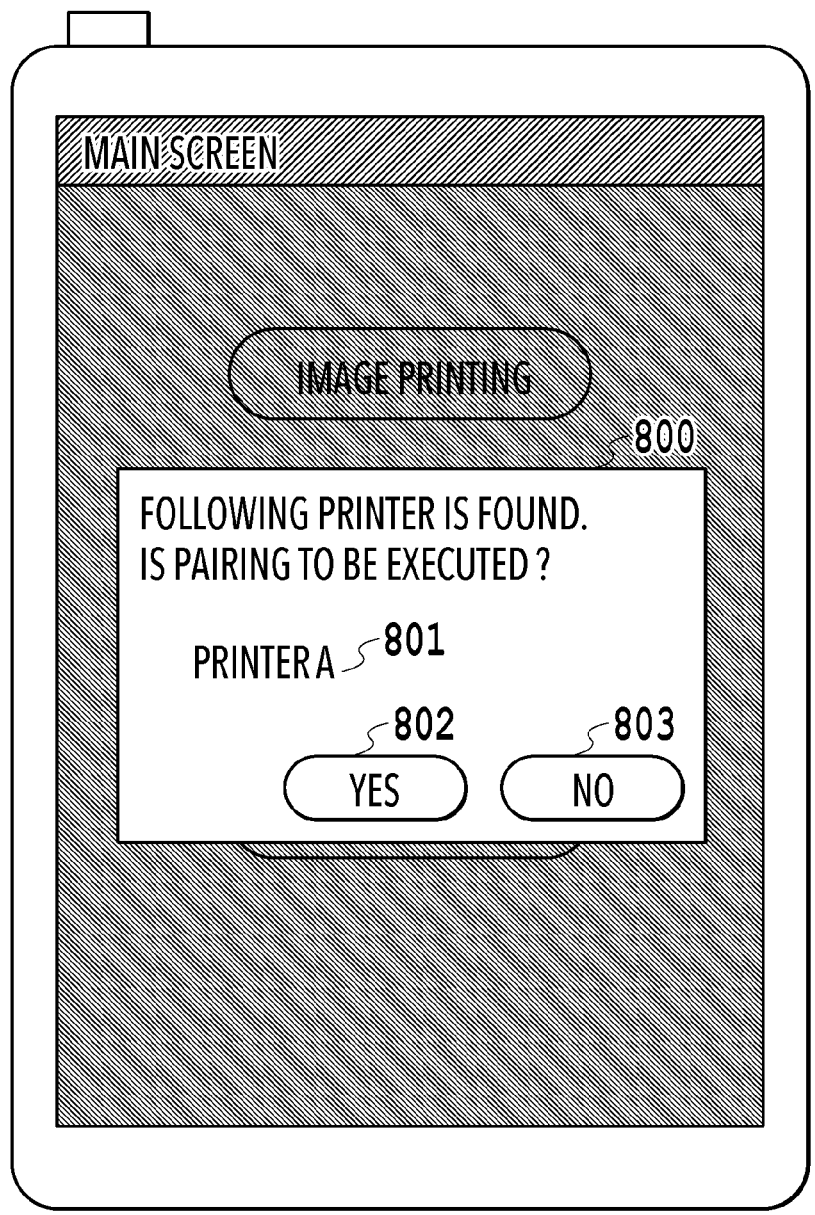
FIG. 10 is an explanatory diagram of a pairing execution checking screen.

On the other hand, in a case where the printer transmitting the advertise is not the registered printer, the process proceeds to the display control of Step S8, and it is checked whether or not pairing is executed for the user. Such pairing execution checking is received by terminal devices of a plurality of unspecified users based on the characteristics of the advertise of BLE, and accordingly, the checking dialog 800 illustrated in FIG. 10 is displayed for the purpose of checking the printer owned by the user. The checking dialog 800 illustrated in this example displays the name 801 of the printer and checks whether or not the displayed printer is a user's desired printer. In a case where "Yes" button 802 is selected, the process proceeds from Step S8 to Step S9, and the pairing process is executed. On the other hand, in a case where "No" button 803 is selected, the pairing process is not executed.

In the pairing process of Step S9, the information processing device 101 requests pairing for the communication device 151. Accordingly, the display unit 160 of the communication device 151 displays the PIN code display screen 200 as illustrated in FIG. 5A, and the print application of the information processing device 101 displays the PIN code input screen 210 illustrated in FIG. 5B on the display unit 108. In this way, the information processing device 101 displays the PIN code input screen 210 and directs the communication device 151 to display the PIN code display screen 200 (output control).

The print application determines whether or not the OK button 213 is selected. In a case where the OK button 213 is selected, the print application transmits a PIN code input to the PIN code input area 211 to the communication device 151 using the BLE. In a case where the PIN code 201 as illustrated in FIG. 5A and the PIN code received from the information processing device 101 match each other, the communication device 151 executes the pairing process and then starts GATT communication.

In this way, the pairing accompanies the input of a PIN code (authentication information) from the PIN code input screen 210 of the information processing device 101 and the display of a PIN code (predetermined authentication information) 201 of the PIN code display screen 200 of the communication device 151. Accordingly, the user can check whether or not the information processing device 101 and the communication device 151 are pairing targets. In a case where the communication device 151 is a printer, together with or instead of the display of the PIN code 201 on the PIN code display screen 200, the PIN code 201 may be printed out. Alternatively, the PIN code 201 may be output using speech or the like. In this way, the communication device 151 may output the PIN code 201 through display, a print, or the like.

In this example, immediately after the start of the operation of the print application, the pairing process is executed. However, the timing at which the pairing process is executed is not limited thereto, and, for example, the pairing process may be executed when the screen of the print application is transitioned and in a case where a specific operation within the screen is executed.

In Step S6 illustrated in FIG. 9, in a case where a state in which the pairing has been completed is determined, since the pairing process is not executed, unnecessary execution of the pairing process can be prevented. In Step S7, in a case where the screen illustrated in FIG. 7C is displayed, a printer is retrieved through a wireless LAN, and the user receives an advertise signal of the registered printer, the display screen of the checking dialog 800 illustrated in FIG. 10 (pairing execution checking screen) is not displayed. Accordingly, in a case where the user permits the use of the printer, it can be prevented to perform unnecessary execution checking again.

In addition, while the information processing device 101 determines whether or not the printer transmitting an advertise signal is a registered printer in Step S7 described above, the determination is not limited thereto. For example, it may be determined whether or not the printer is the current printer among registered printers (a printer selected by the user among registered printers). In addition, in a case where information representing an error is included in the advertise signal, in other words, in a case where the value of the second octet in the advertise structure area 520(2) described above is "1" representing the occurrence of an error in the communication device 151, the information processing device 101 executes error display. Also in such a case, the error display may be executed under a condition that the transmission source of the advertise signal is a registered printer (or the current printer among the registered printers). In addition, for example, a case may be considered in which advertise signals are received from a plurality of different printers, all the advertise signals include error information, there are the current printer and the registered printer in the plurality of printers, and a printer that is not the current printer is included. In such a case, the error information of the current printer may be displayed with priority. As a method of the displaying with priority, for example, an error screen of the current printer may be displayed first, and, when the error screen is closed, the error screen of a registered printer may be displayed. In addition, in a case where the error information of a plurality of printers are displayed in the form of a list, the error information of the current printer may be displayed at a higher rank in the list, and the error information of the registered printer may be displayed at a lower rank.

(Photograph Guide)

In the process illustrated in FIG. 9 described above, a printer to execute printing is specified using BLE. Thereafter, an image to be printed by the printer is selected by the user.

The print application sets the image data stored in the external storage device 106 of the information processing device 101 as a printing target. In a case where the image data is displayed on the image selection screen 613 illustrated in FIG. 8A as a list, when the number of pieces of image data is large, it is difficult for a user to retrieve and select image data that is a printing target. For this reason, the print application has a function of extracting image data under a specific condition. The extraction function, for example, executes hierarchical display of image data stored in the external storage device 106, selects a specific group (for example, a folder) in which the image data is included, or selects a range of imaging date or generation date of the image data, and extracts image data to be displayed on the screen. Such an operation for extracting image data can be realized by urging a user to select image data by displaying a UI not illustrated in the drawing using the print application.

In addition, as another method for extracting image data, there is a method in which a specific timing relating to the print application (for example, a timing at which the operation of the print application is started) is stored and used. In other words, in a case where the print application is started to operate, it is checked whether or not new image data was stored in the external storage device 106 after the stored timing, and a result thereof is notified to the user.

Figure 11:
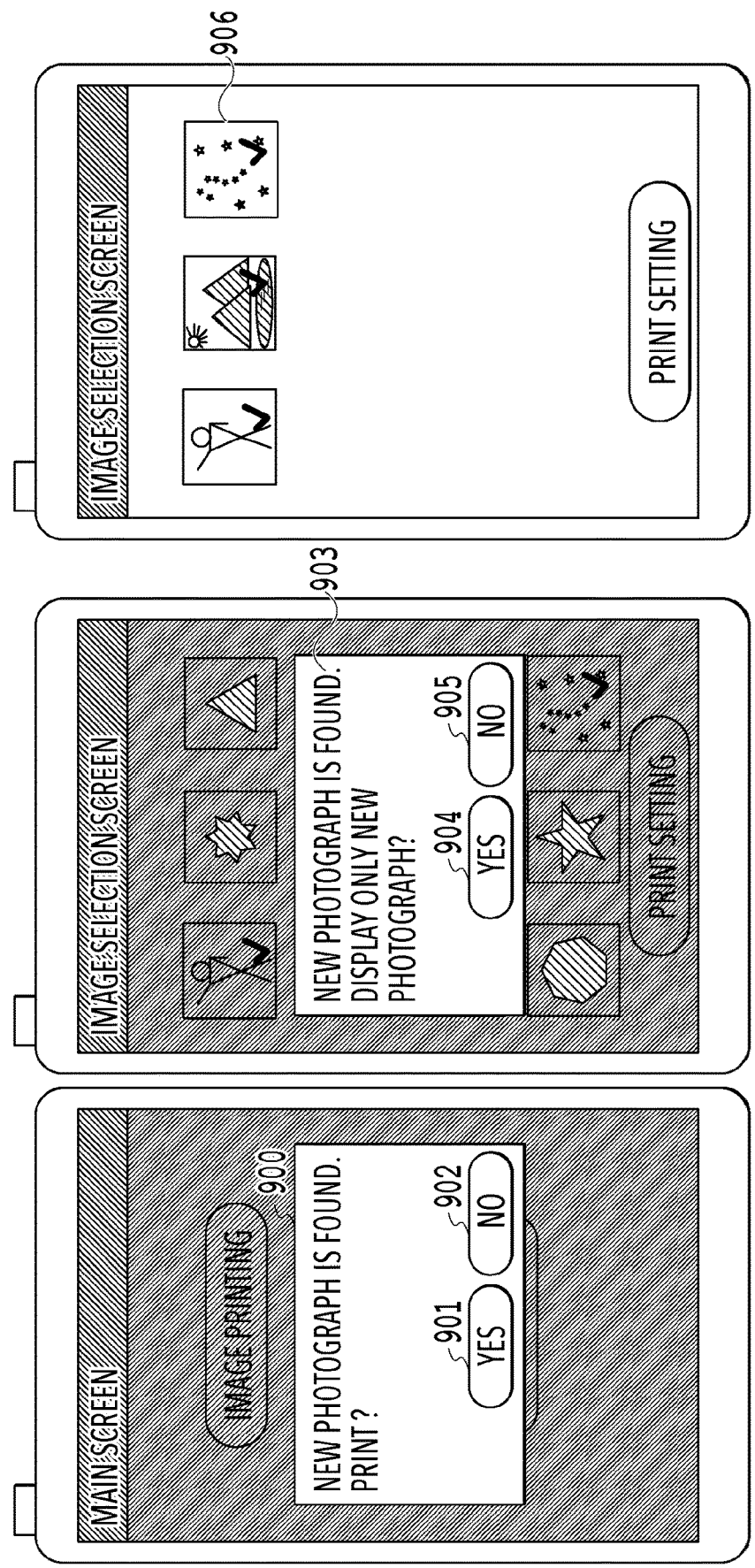
FIG. 11A is an explanatory diagram of a display screen at the time of execution of printing.
FIG. 11B is an explanatory diagram of a display screen at the time of execution of printing.
FIG. 11C is an explanatory diagram of a display screen at the time of execution of printing.

FIG. 11A is an explanatory diagram of a case where such checking is executed on the main screen when the operation of the print application is started. A notification dialog 900 is displayed on the main screen 604 illustrated in FIG. 7B (additional image data display) in a case where it is determined that image data has been added in an additional image data checking process to be described later. In the notification dialog 900, a message representing that additional image data is present and a button used for a transition to the image selection screen are displayed. In a case where the "Yes" button 901 is selected, the screen is automatically transitioned to the image selection screen 613 illustrated in FIG. 8A, and only the additional image data is displayed on the image selection screen 613. On the other hand, in a case where the "No" button 902 is selected, the notification dialog 900 becomes a non-display state. A display switching checking dialog 903 illustrated in FIG. 11B is displayed in a case where it is checked that additional image data is present in a checking process executed after displaying the image selection screen 613 illustrated in FIG. 8A. In the display switching checking dialog 903, a message for inquiring whether or not only the additional image data is displayed and a button used for determining whether or not an extraction function is executed are displayed. In a case where a "Yes" button 904 is selected, a screen illustrated in FIG. 11C is displayed according to the extraction function. The image data 906 is additional image data. On the other hand, in a case where a "No" button 905 is selected, the notification dialog 900 becomes the non-display state.

Figure 12:
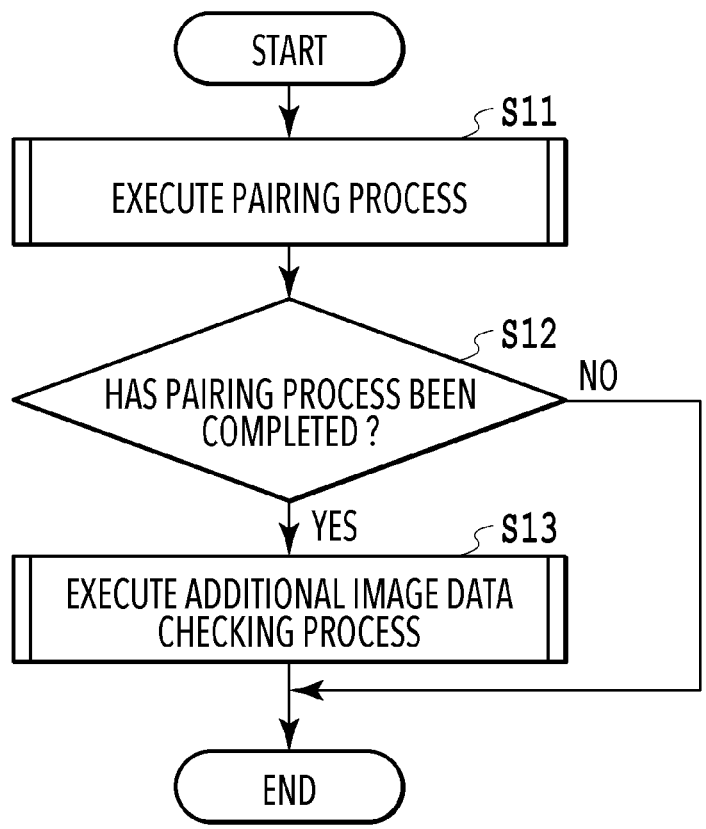
FIG. 12 is a flowchart for describing a relation between a pairing process and an additional image data checking process.

FIG. 12 is a flowchart for describing the pairing process and the additional image data checking process.

First, in Step S11, the pairing process illustrated in FIG. 9 described above is executed, and, in the next Step S2, it is checked whether or not the pairing process has been completed (pairing completion checking). In Step S11, similar to Steps S5 and S6 illustrated in FIG. 9, the list is acquired, and it is checked whether or not information of a printer transmitted this advertise signal is included in the list. As cases where the pairing process has not been executed, for example, there are a case where the advertise signal is not a specific advertise signal, a case where the user does not desire the pairing process, and the cancel button 212 illustrated in FIG. 5B is selected, and the like. In such a case, it is determined that the printer that has transmitted the advertise signal is not a printer owned by the user or the user selects not to use the BLE function, and the process illustrated in 12 ends. On the other hand, in a case where the pairing process has been completed, the additional image data checking process is executed (Step S13).

Figure 13:
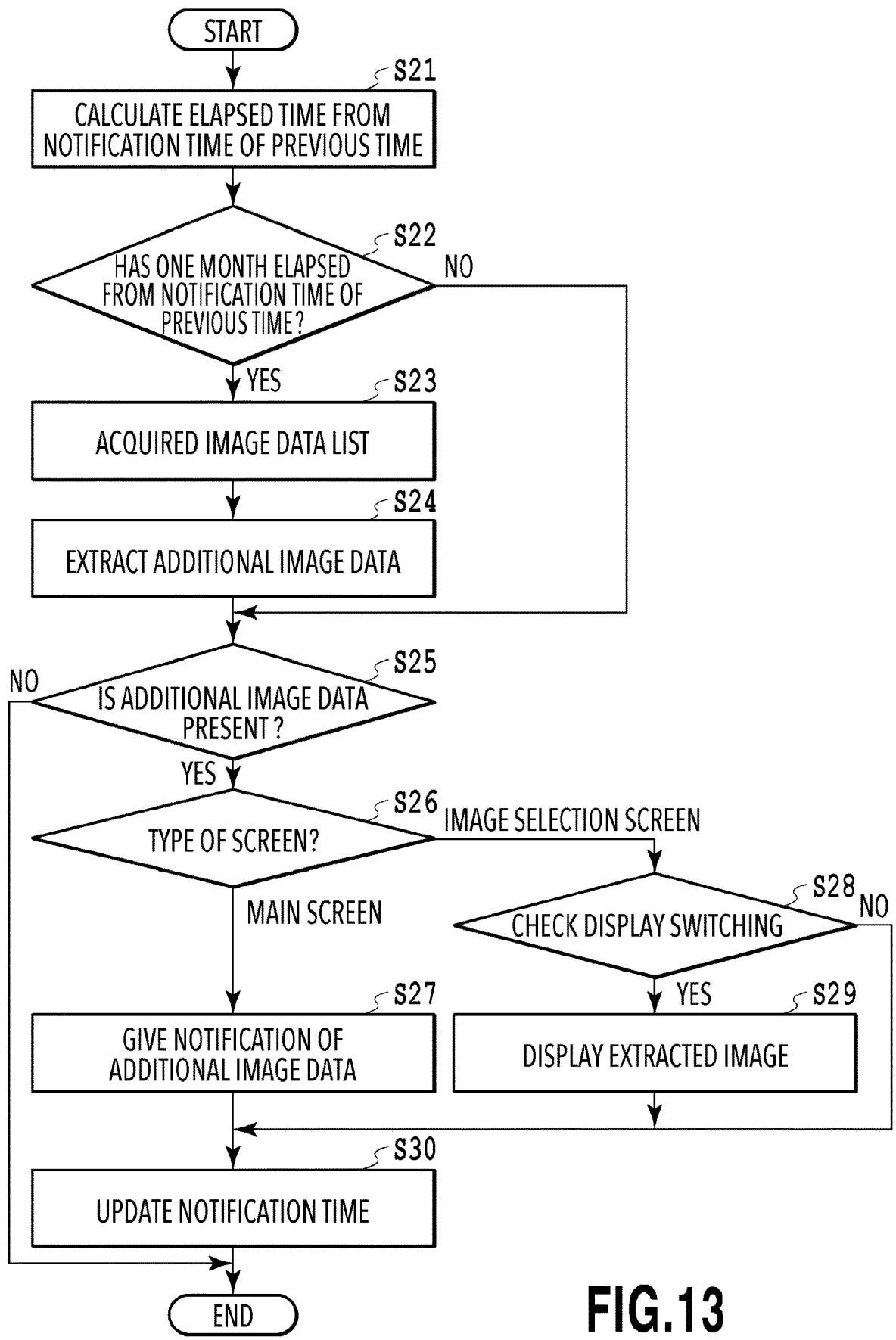
FIG. 13 is a flowchart for describing an additional image data checking process.

FIG. 13 is a flowchart for describing the additional image data checking process.

First, a time (a notification time of the previous time) of the previous notification is acquired from the external storage device 106 using the notification dialog 900 illustrated in FIG. 11A or the display switching checking dialog 903 illustrated in FIG. 11B, and a difference between the notification time and the current time is calculated (Step S21). Thereafter, it is determined whether or not the calculated time is a predetermined time or more (Step S22). In the case of this example, it is determined whether or not one month has elapsed from the notification time of the previous time on the basis of the calculated time. The notification time will be described later. In this way, by considering an elapsed time from the notification time of the previous time, the notification dialog 900 is controlled not to be frequently displayed. In a case where a predetermined time has elapsed from the notification time of the previous time, a list of image data stored inside the external storage device 106 is acquired (Step S23), and image data added after the notification time of the previous time (additional image data) is extracted from the list of the image data (Step S24). In this example, at this time, although the imaging time of exchangeable image file format (EXIF) information included in the image data is used, the extraction method is not limited thereto. For example, a time stamp (update date and time or generation date and time) of the image data or a naming rule for including imaging time in a file name may be used.

After the extraction of the additional image data is completed, it is checked whether or not additional image data is present (Step S25). In a case where additional image data is not present, the process ends. On the other hand, in a case where additional image data is present, the type of screen of the print application is checked (Step S26). In a case where the screen is the main screen, after the notification dialog 900 illustrated in FIG. 11A described above is displayed as a notification of the additional image data (Step S27), and the notification time is updated (Step S30). On the other hand, in a case where the screen is the image selection screen, in order to check the display switching, the display switching checking dialog 903 illustrated in FIG. 11B is displayed (Step S28). In a case where the display switching is selected by the user, similar to FIG. 11C, only the additional image data 906 is displayed (Step S29), and the notification time is updated (Step S30).

The reason for switching the process in accordance with the type of screen is that a function is assigned to each screen. In the case of this example, since the image selection screen has a function of displaying a list of images, a switching process displaying only the additional image data is executed using the screen. On the other hand, since the main screen does not have the function of listing images, the additional image data is notified using the screen. In addition, the reason for not using the other screens is for preventing the complication of the configuration of screen transitions and user's operations.

In this example, while the switching between processes is executed using the screen, the method of the switching is not limited thereto. For example, the switching may be executed at a timing at which a button is pressed (a button is selected) or the like, or switching may be executed by using not the screen but the dialog. In this example, while the execution timing of the additional image data checking process is set on the basis of the elapsed time, the method of setting the execution timing is not limited thereto. For example, the number of times of starting the operation of the print application may be counted, and the checking process may be executed after starting the operation of the print application a predetermined number of times.

By executing such a series of processes, an increase/decrease in the image data is notified to the user, and, only the additional image data is displayed, whereby the selectivity of image data that is a printing target is improved. In addition, by continuing this process in accordance with the reception of the advertise of BLE from the printer, the notification can be made under a situation in which the printer is determined to be present at a close position, and the user can execute printing.

In addition, the additional image data checking process (Step S13) illustrated in FIG. 12 may be executed under a condition that the printer completed to be paired is a registered printer (or the current printer) in addition to the completion of the pairing process (Step S12).

(Release of Sleep of Printer)

In order to suppress power consumption, a printer becomes a dormant state (sleep state) in which power is supplied only to minimum devices required for maintaining the printer function. The printer may be automatically becomes a dormant state after a predetermined time elapses or in accordance with a user's direction. When the printer is in the dormant state, in a case where the user executes a process such as printing, the process of releasing the dormant state of the printer main body to be in an operating state (hereinafter, referred to as a "restart process") is necessary. Hereinafter, in a case where the pairing process of the information processing device 101 and the printer as the communication device 151 is completed, the restart process of the printer in the GATT communication of BLE will be described. In addition, in a case where the printer is an ink jet printer, ink is ejected from a print head, and there is concern that, when a predetermined time elapses, ink in the print head is fixed, and an improper ejection of ink occurs. As a solution for that, a process for maintaining the good condition of the print state (hereinafter, referred to as a "recovery process") such as ejecting ink not contributing to the printing of an image from the print head to eject fixed ink in the print head or the like is executed.

A predetermined time is required for the restart process and the recovery process of the printer, and, during the period, the process of the printer or the like cannot be temporarily stopped or executed. Thus, the printer is directed to be re-started using the GATT communication of BLE such that a process of printing or the like can be executed immediately when such a process is directed by the user.

Figure 14:
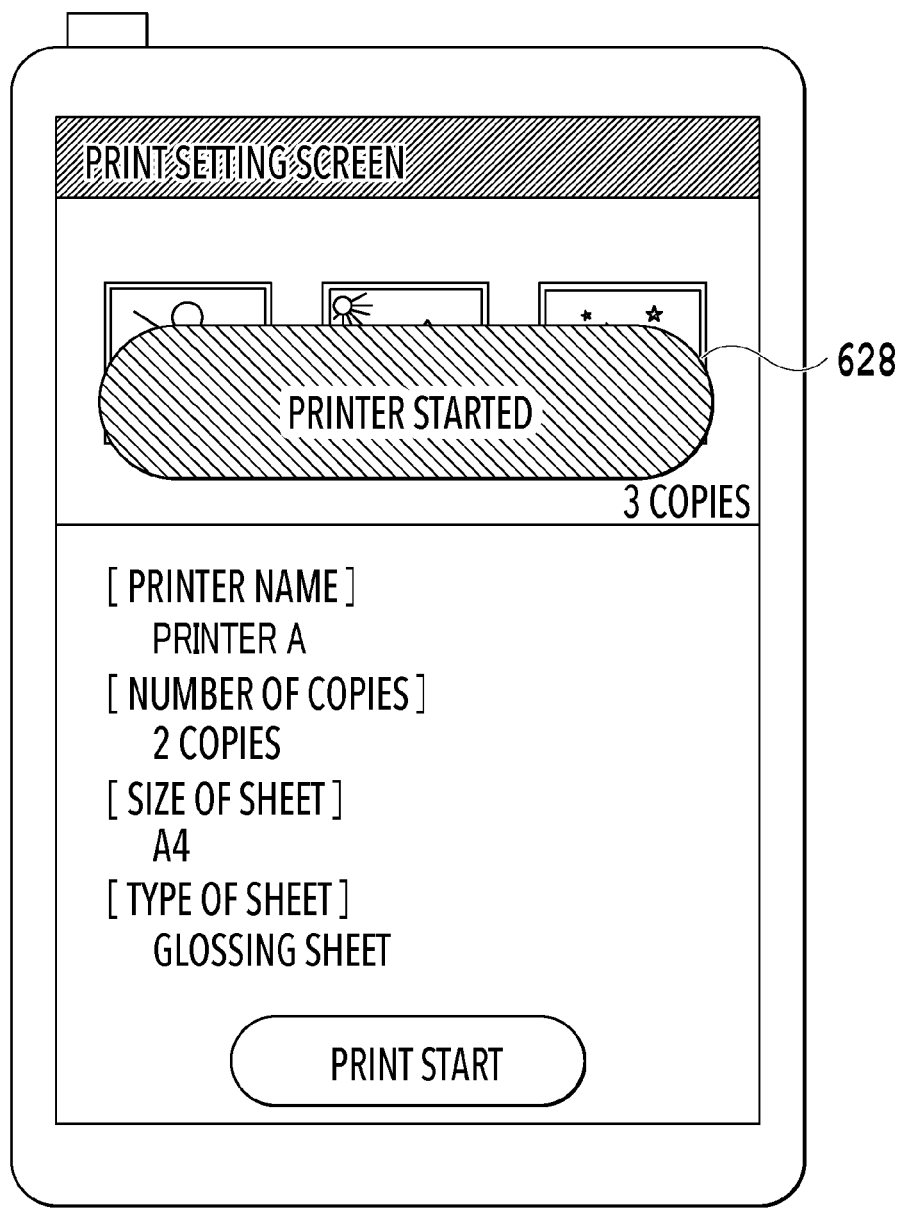
FIG. 14 is an explanatory diagram of a display screen at the time of performing a restart process.

FIG. 14 is an explanatory diagram of a message 628 displayed inside the print setting screen of the print application, and the execution of the restart process of the printer is notified to the user using this message 628. In this example, as illustrated in FIG. 14, when a screen is transitioned to the screen for which printing can be started, the restart process and the recovery process are executed as is necessary.

Figure 15:
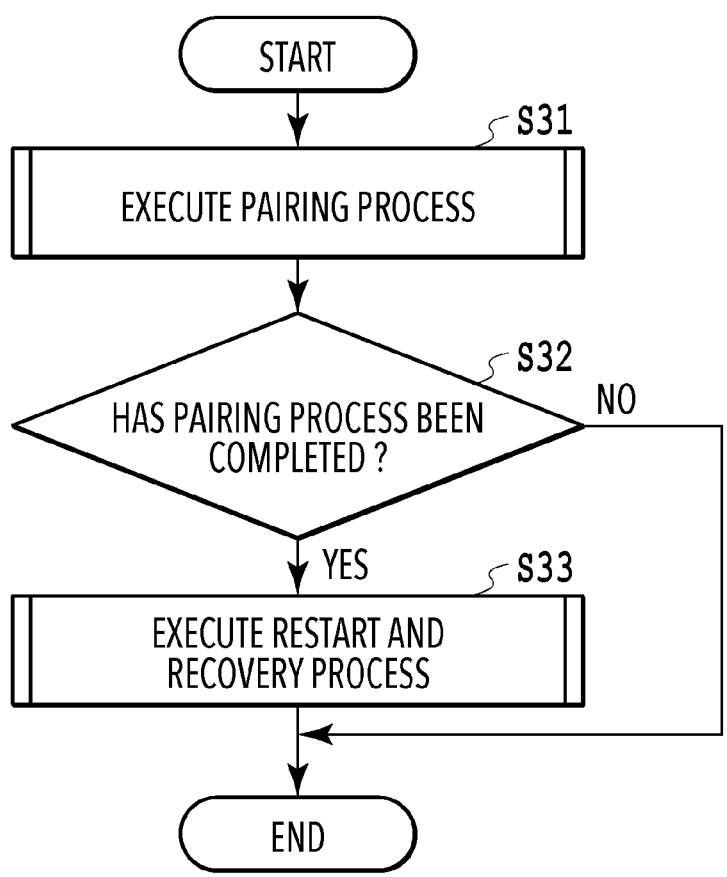
FIG. 15 is a flowchart for describing a relation among a pairing process, a restart-time process, and a recovery process.

FIG. 15 is a flowchart for describing a relation among the pairing process, the restart process, and the recovery process. The pairing process described above is executed (Step S31), and, after the execution is completed, the restart process and the recovery process are executed (Steps S32 and S33).

Figure 16:
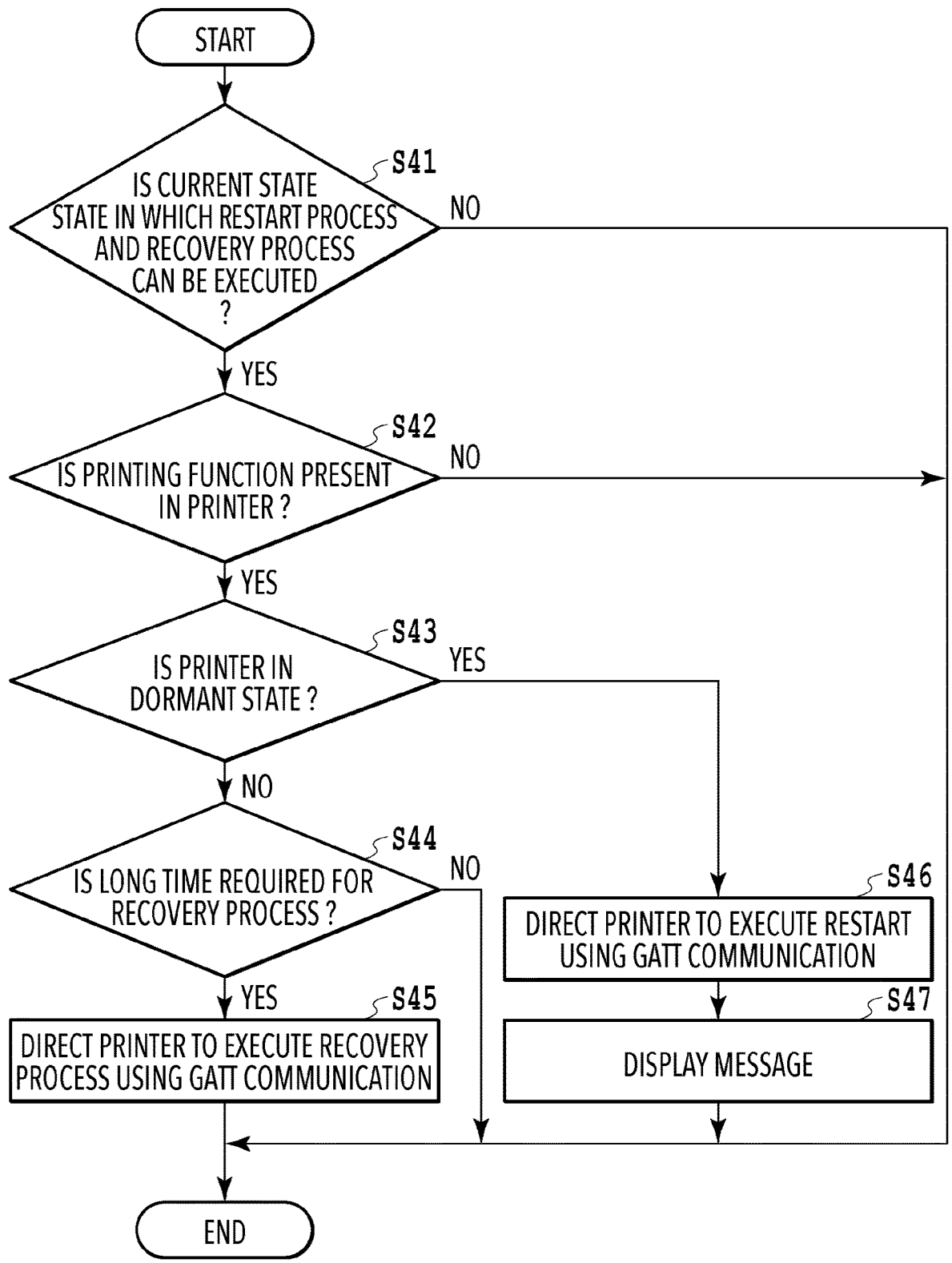
FIG. 16 is a flowchart for describing a restart-time process and a recovery process.

FIG. 16 is a flowchart for describing the restart process and the recovery process. In this example, when the restart process of a printer is executed, it is checked whether or not the printer requires the recovery process. Accordingly, in a case where the restart process is directed by the print application, the recovery process of the printer is executed.

First, in Step S41 illustrated in FIG. 16, it is determined whether or not the restart process and the recovery process can be executed. In this example, the current printer described above is selected, the current printer transmits advertise, and it is determined whether or not a print setting screen for which printing can be started is displayed. In addition, a condition used for determining whether or not the restart process and the recovery process can be executed is not limited to the condition of this example. For example, the restart process and the recovery process may be executed on the basis of another screen or a user's operation such that the restart process and the recovery process are executed in a case where image data of a printing target is selected on the image selection screen in a state in which a print button according to handover to be described later is displayed. In addition, there are cases where a printer is configured such that information relating to the printer such as ink information (printer information) cannot be acquired when the printer is not in the operating state. In such cases, when printer information is required to be acquired by the print application, the restart process and the recovery process may be executed. In addition, in a case where a predetermined time or more is determined to be required for the recovery process, the restart process and the recovery process may be executed regardless of the displayed screen.

In a case where it is determined that the restart process and the recovery process can be executed, it is determined whether or not the printer has a printing function capable of printing an image (Step S42). More specifically, the determination is executed on the basis of the information relating to the function and the state of the communication device included in the advertise information of the BLE acquired in the pairing process (Step S31).

FIG. 17 is an explanatory diagram of the information relating to the function and the state of the communication device of this example. In a case where a printer has a printing function, information representing inclusion of a printing function is stored in the storage area of the information relating to the function and the state of the communication device. In the example illustrated in FIG. 17, an area of the first octet is a storage area of the information representing the presence/absence of the printing function, and "1" stored in the value means that the printing function is included. On the other hand, in a case where the printing function is not included, "0" is stored. In a case where the printing function is not included, the process illustrated in FIG. 16 ends.

In a case where the printing function is included, it is determined whether or not the printer is in a dormant state (Step S43). More specifically, the determination is executed on the basis of the information relating to the function and the state of the communication device included in the advertise information of BLE acquired in the pairing process (Step S31). In a case where the printer is in the dormant state, information representing the dormant state is stored as the information relating to the function and the state of the communication device. In the example illustrated in FIG. 17, information representing whether or not the printer is in the dormant state is stored in an area of a fourth octet, and "1" stored in the value means that the printer is in the dormant state. On the other hand, in a case where the printer is in the operating state, "0" is stored.

On the other hand, in a case where the printer is not in the dormant state, a time required for the recovery process is determined (Step S44). More specifically, the determination is executed on the basis of the information relating to the function and the state of the communication device included in the advertise information of BLE acquired in the pairing process (Step S31). In a case where a time is required for the recovery process, information relating to a time required for the recovery process is stored as the information relating to the function and the state of the communication device. In the example illustrated in FIG. 17, information relating to a time required for the recovery process is stored in an area of the fifth octet, "1" stored in the value means that a long time is required for the recovery process. On the other hand, "0" is stored in a case where a long time is not required for the recovery process. In a case where a long time that is a predetermined time or more is required for the recovery process, the recovery process is executed before the user executes printing. On the other hand, in a case where a long time is not required for the recovery process, even in a case where the recovery process is executed when the user executes printing, there is not a large influence on the completion time of the printing. Accordingly, in a case where it is determined that a long time is not required for the recovery process, the recovery process is not executed, and the process illustrated in FIG. 16 ends. On the other hand, it is determined that a long time is required for the recovery process, GATT communication with the printer is established, and the printer is directed to execute the recovery process. Thereafter, the process illustrated in FIG. 16 ends.

On the other hand, in Step S43, in a case where it is determined that the printer is in the dormant state, GATT communication with the printer is established, and the printer is directed to execute the restart process (Step S46). Thereafter, a notification message 628 (see FIG. 14) representing the restart of the printer for the user is displayed. After the message 628 is displayed, the process illustrated in FIG. 16 ends. When the recovery process is executed, an outstanding operation of restarting the printer is not executed, and thus, a message representing the execution of the recovery process for the user is not displayed.

In this way, by executing the restart process and the recovery process in accordance with the states of the printer and the print application, while the execution of the recovery process consuming ink is suppressed, when the user directs printing, the printing process can be immediately executed. In addition, since the BLE can execute communication with low power consumption, the printer can execute communication even in the dormant state without increasing the power consumption much.

In this way, in a case where the advertise information in the BLE is received from the communication device that is completed to be paired in the BLE, the information processing device checks the state of the communication device based on the information of the advertise (checks the state relating to whether or not the restart process and the recovery process can be executed). Then, the information processing device directs the communication device to execute a process according to the checked state of the communication device.

In addition, the restart process and the recovery process (Step S33) illustrated in FIG. 15 may be executed under a condition that the printer completed to be paired is a registered printer (or the current printer) in addition to the completion of the pairing process (Step S31). In a case where the condition that the printer completed to be paired is the current process is set, when advertise signals are received from a plurality of different printers are received, and all of the printers are in the dormant state, the restart process or the recovery process of only the current printer is executed. In this way, for example, unnecessary execution of the restart process or the recovery process for a printer for which the user has no intention of use can be prevented.

(Display of Print Button of Handover)

Handover is a method in which an information processing device acquires network information used for a connection with a communication device from the communication device, and the information processing device and the communication device are connected using a network type different from that at the time of the acquisition. Hereinafter, a case where the communication device is a printer will be described as an example.

In the print application described above, in the state in which a connection between the printer and the information processing device is established, the printer is registered in the print application, and an image is printed using the registered printer. However, the process sequence is not limited to such a process sequence. For example, by using the handover function, an image can be printed using a printer not connected to a network or a printer that has not been registered. More specifically, by using the GATT communication of the BLE, the information processing device 101 acquires handover information used for a connection using a wireless LAND from the communication device 151, and the information processing device 101 establishes a connection with the communication device 151 using the wireless LAN.

Figure 18:
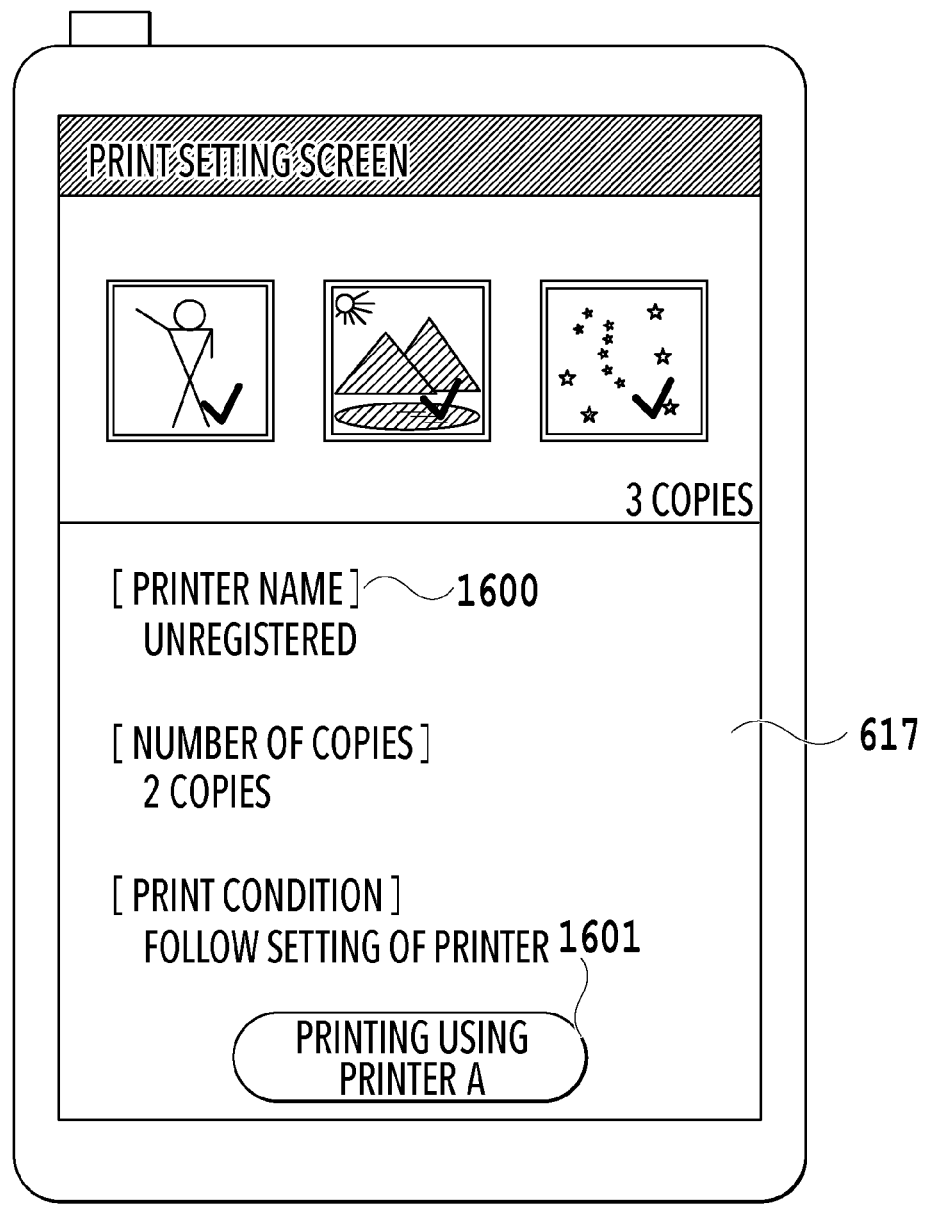
FIG. 18 is an explanatory diagram of a display screen at the time of performing a handover process.

FIG. 18 is an explanatory diagram of a display screen of a print application that can perform a handover process. In this example, printing is assumed to be executed using a printer A. It is represented that the printer name 1600 is "not registered", and the printer A is not a registered printer, and a connection between the information processing device and the printer A has not been established. In a case where it is determined that handover can be executed from the information included inside the advertise signal transmitted from the printer A (information of an area of the third octet in FIG. 17), a print button 1601 illustrated in FIG. 18 is displayed (function display). In a case where the user selects the print button 1601, the handover process is executed.

Figure 19:
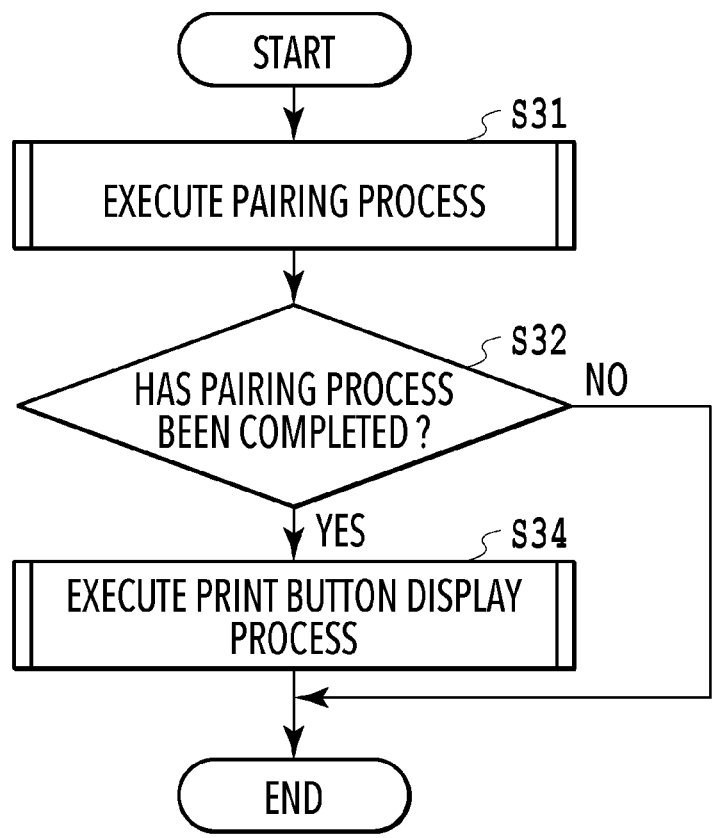
FIG. 19 is a flowchart for describing a relation between a pairing process and a print button display process.

FIG. 19 is a flowchart for describing a relation between a pairing process and a print button display process. The pairing process described above is executed (Step S31), and, after the pairing process is completed, a print button display process is executed (Step S32 and S34).

Figure 20:
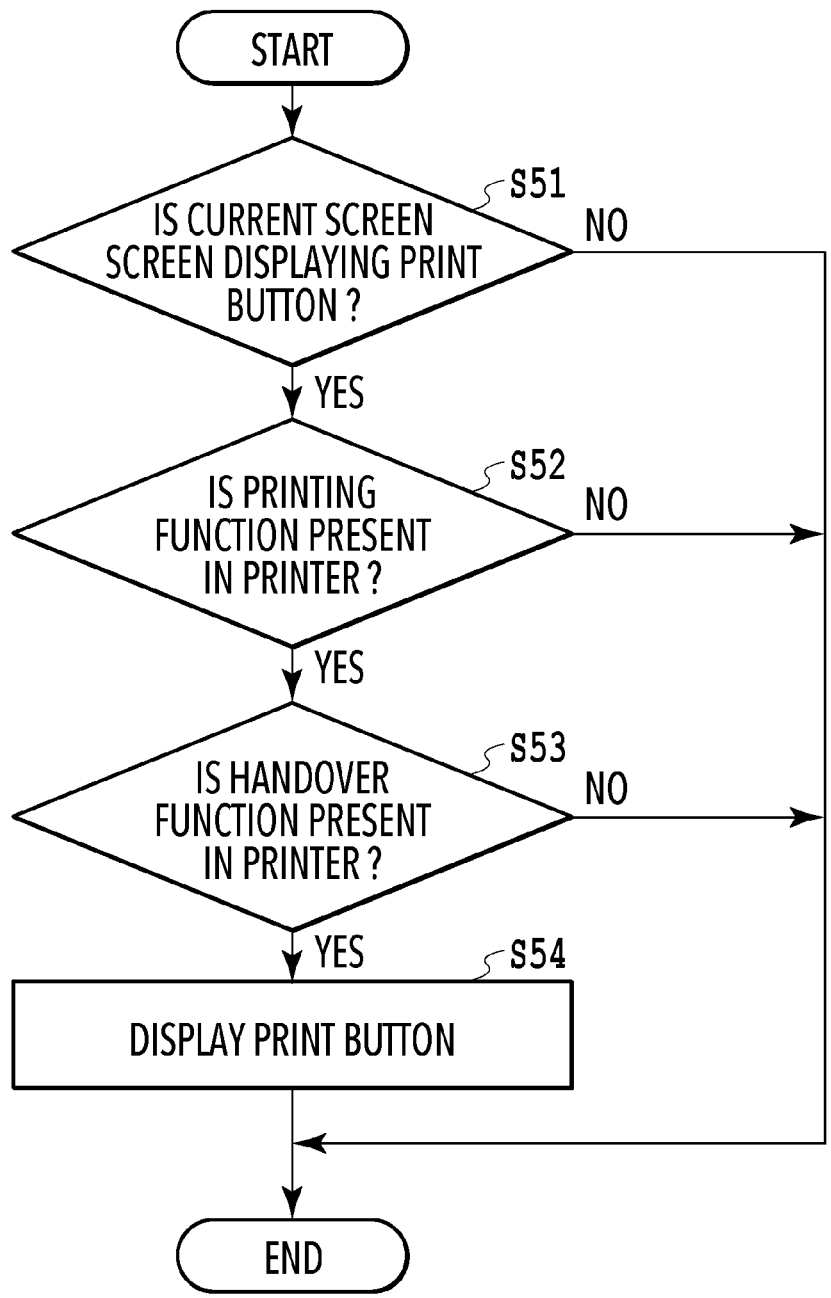
FIG. 20 is a flowchart for describing a print button display process.

FIG. 20 is a flowchart for describing the print button display process.

First, it is determined whether or not the current screen is a screen on which a print button is displayed (Step S51). In this example, it is determined whether the current screen is a screen on which image data of a printing target is selected. In a case where the screen of the print application includes screens illustrated in FIGS. 7A, 7B, 7C and FIGS. 8A, 8B, and 8C, the image selection screen 613 illustrated in FIG. 8A and the print setting screen 617 illustrated in FIG. 8B correspond to screens on which a print button is displayed. In a case where the current screen is not the screen on which image data has been selected, the process illustrated in FIG. 20 ends.

On the other hand, in a case where the current screen is the screen on which image data has been selected, it is determined whether or not the printer has a printing function (Step S52). More specifically, the determination is executed on the basis of the information relating to the function and the state of the communication device inside the advertise information of the BLE acquired in the pairing process (Step S31). FIG. 17 is the explanatory diagram of the information relating to the function and the state of the communication device in this example. In a case where a printer has a printing function, information representing inclusion of a printing function is stored in the storage area of the information relating to the function and the state of the communication device. In the example illustrated in FIG. 17, information representing presence/absence of a printing function is stored in the area of the first octet, and "1" stored in the value means that the printing function is included. On the other hand, in a case where the printing function is not included, "0" is stored. In a case where the printing function is not included, the process illustrated in FIG. 20 ends.

In a case where the printing function is not included, it is determined whether or not the printer has a handover function (Step S53). More specifically, the determination is executed on the basis of the information relating to the function and the state of the communication device included in the advertise information of BLE acquired in the pairing process (Step S31). In a case where the printer has the handover function, information representing the inclusion of the handover function is stored. In the example illustrated in FIG. 17, information representing that the handover function is included is stored in the area of the third octet, and "1" stored in the value means that the handover function is included. On the other hand, in a case where the handover function is not included, "0" is stored. In a case where the handover function is not included in the printer, the process illustrated in FIG. 20 ends. In a case where the handover function is included in the printer, the print button 1601 illustrated in FIG. 18 is displayed (Step S54). A text disposed inside the print button 1601 represents the communication device name of the advertise information.

In this example, a case has been described in which the communication device is a printer. However, it is apparent that the process can be applied also to a communication device having a different function such as scanning.

In addition, the print button display process (Step S34) illustrated in FIG. 19 may be executed under a condition that the printer completed to be paired is a registered printer (or the current printer) in addition to the completion of the pairing process (Step S31).

Alternatively, the print button display process (Step S34) illustrated in FIG. 19 may be executed regardless whether or not the printer completed to be paired Step S31) is a registered printer. In such a case, when the print button is selected, handover may be executed by a process illustrated in FIG. 21 to be described later under a condition that the printer is a registered printer (or the current printer). In addition, when the print button is selected, even in a case where the printer is not a registered printer (or not the current printer), in accordance with a user's direction for permitting handover, the handover may be executed.

(Handover)

Figure 21:
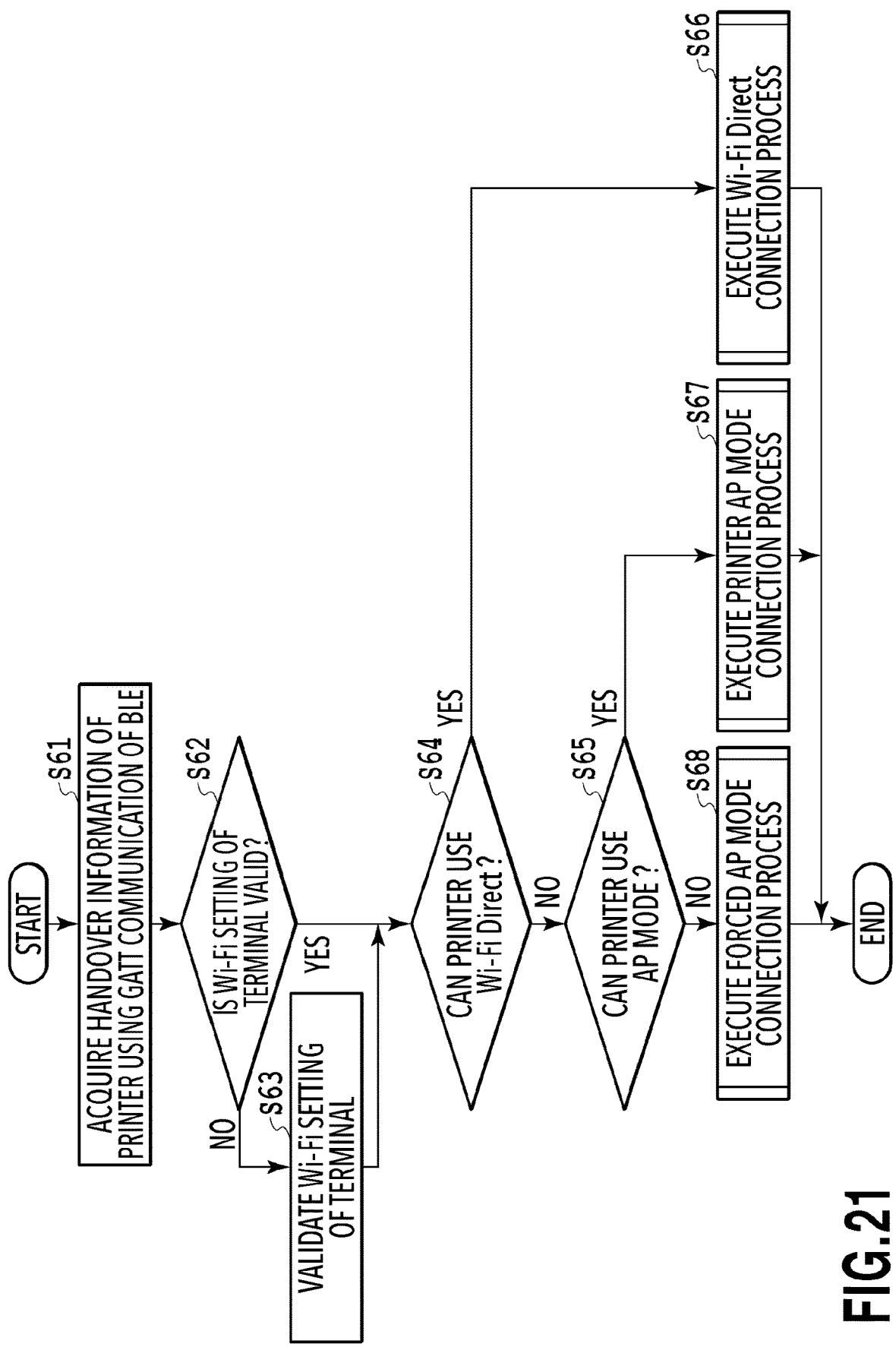
FIG. 21 is a flowchart for describing a handover process.

FIG. 21 is a flowchart for describing handover that is executed in a case where the print button 1601 is selected by the user.

First, the information processing device acquires handover information using the GATT communication of the BLE from the printer (Step S61). In the handover information, three kinds of information relating to the network setting of the printer are included. More specifically, three kinds of information include (1) a MAC address of the printer, (2) an SSID and a password when the communication device is in an access point mode (hereinafter, referred to as an "AP mode"), and (3) a network connection mode of the printer that can be currently used. In addition, the information of (3) connection mode is one of the AP mode, an infrastructure mode, and a Wi-Fi Direct mode. A network connection that can be used is not always connected. The AP mode is a mode in which the communication unit 156 of the communication device 151 illustrated in FIG. 1 has the function of an access point, and the information processing device 101 can be directly connected to the communication device 151 not through the access point 131.

After the handover information is acquired, it is determined whether or not the Wi-Fi setting of the information processing device is valid (Step S62). The Wi-Fi setting being valid means that the information processing device being in a Wi-Fi communicable state. In a case where the Wi-Fi setting is valid, the process proceeds to Step S64. On the other hand, in a case where the Wi-Fi setting is invalid, after the Wi-Fi setting of the information processing device is validated (Step S63), the process proceeds to Step S64.

In Steps S64 and S65, the current network connection mode (information (3)) of the printer is determined. In other words, in Step S64, it is determined whether or not the printer can use Wi-Fi Direct. In a case where Wi-Fi Direct can be used, the information processing device executes a process for being connected to the printer through Wi-Fi Direct (Step S66). In accordance with the end of the connection process, the process illustrated in FIG. 21 ends. In a case where Wi-Fi Direct cannot be used, it is determined whether or not the printer can use the AP mode (Step S65). In a case where the AP mode can be used, the information processing device executes a process for being connected to the AP mode of the printer (Step S67). In accordance with the end of the connection process, the process illustrated in FIG. 21 ends. In a case where the AP mode cannot be used, the printer is temporarily started to operate in the AP mode in accordance with a direction from the information processing device, and the printer is connected in the AP mode (hereinafter, referred to as a "force AP mode") (Step S68). In this way, in a case where the connection mode is temporarily changed, after the process (in this example, printing) for handover ends, in accordance with a direction from the information processing device, the printer is returned to the original network connection mode.

Since there is a possibility that a printer is used by a plurality of unspecified persons, the handover process is executed such that the network state of the printer is not changed as possible as can. The printer may be able to be simultaneously connected to a plurality of network connection modes, and, even in such a case, the process illustrated in FIG. 21 can be applied. In this example, a Wi-Fi Direct connection is prioritized among the connection modes that can be currently used by the printer. The reason for this is that, in a case where there is an OS of an information processing device that cannot make simultaneous connections using mobile data communication and Wi-Fi, when a connection is made using Wi-Fi, the mobile data communication cannot be executed, and the user's convenience is degraded. Meanwhile, even such an OS, in the case of a Wi-Fi Direct connection, can execute a simultaneous connection with the mobile data communication, and thus, the Wi-Fi Direct connection is prioritized.

Figure 22:
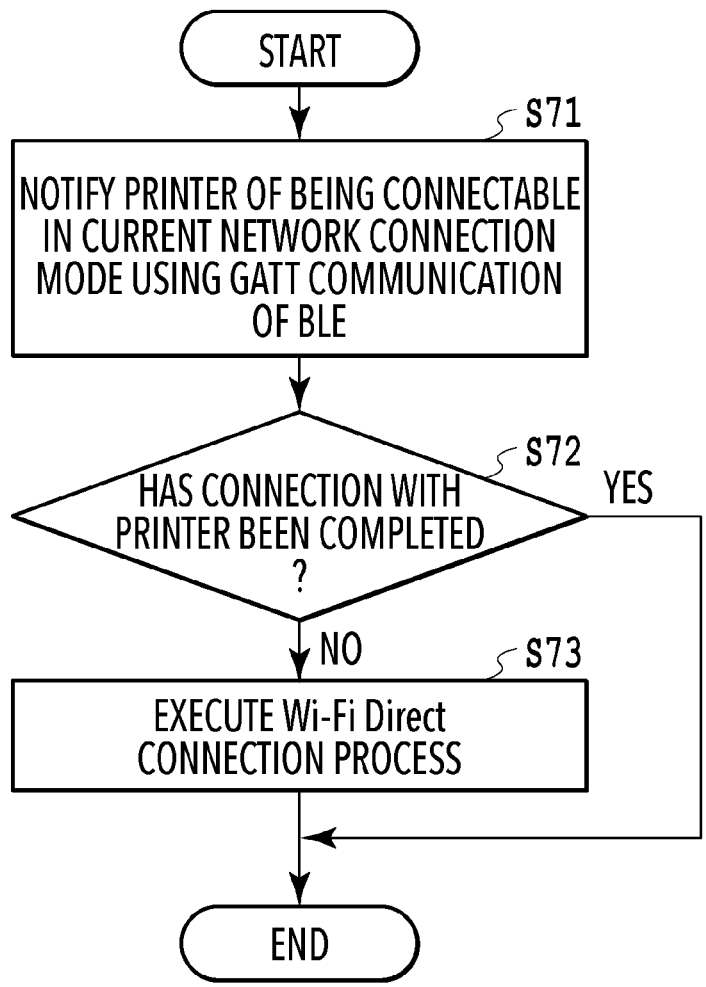
FIG. 22 is a flowchart for describing a Wi-Fi Direct connection process.

FIG. 22 is a flowchart for describing the Wi-Fi Direct connection process.

First, the information processing device notifies the printer that the printer is connectable using the current network connection mode through GATT communication of BLE (Step S71). In accordance with the reception of the notification, the printer becomes an exclusive mode in which a mode change and execution of a process from other information processing devices are not accepted and waits for a connection with the information processing device. In addition, after the process for handover (in this example, printing) ends, the exclusive mode automatically ends. The process proceeds from Step S71 to Step S72, and it is determined whether or not the information processing device and the printer are already connected to each other. More specifically, the information processing device broadcasts within the network and detects a printer matching the MAC address (information (1)) of the printer acquired in Step S61 illustrated in FIG. 21. In a case where such a printer is detected, a state is determined in which the connection with the printer has already ended, and the process illustrated in FIG. 22 ends. In a case where the connection with the printer is not made, the Wi-Fi Direct connection process is executed (Step S73), and the printer and the information processing device are connected to each other using the Wi-Fi Direct. In the Wi-Fi Direct connection, by using the MAC address (information (1)) of the printer acquired in Step S61 illustrated in FIG. 21, in accordance with a connection request from the information processing device, connection permission for the information processing device is requested for a user by using the display unit 160 (see FIG. 1) of the printer. As the connection is permitted, the printer and the information processing device are connected to each other using the Wi-Fi Direct.

Figure 23:
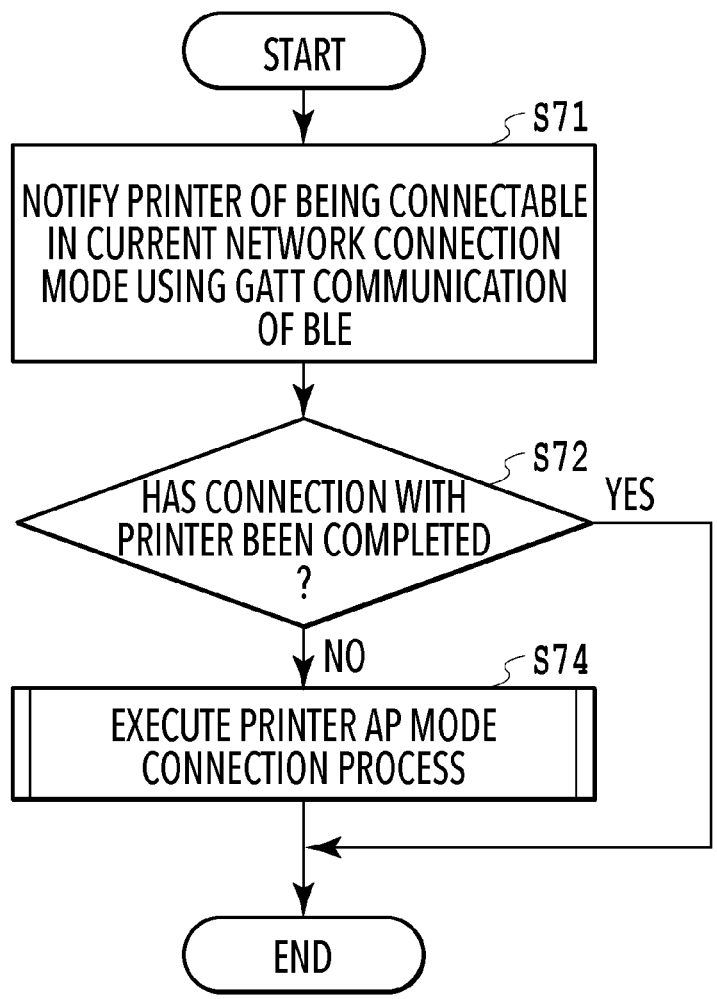
FIG. 23 is a flowchart for describing an AP mode connection process.

FIG. 23 is a flowchart for describing the AP mode connection process.

Similar to Steps S71 and S72 illustrated in FIG. 22, after the printer is notified of being connectable in the current network connection mode by using GATT communication of BLE, it is determined whether or not the information processing device and the printer are already connected to each other. In a case where the information processing device and the printer are not connected each other, the AP mode connection process of the printer is executed (Step S74). In such a connection process, by using the SSID and the password (information (2)) of the printer at the time of executing the AP mode acquired in Step S61 illustrated in FIG. 21, a connection with the printer that is in the AP mode is established.

Figure 24:
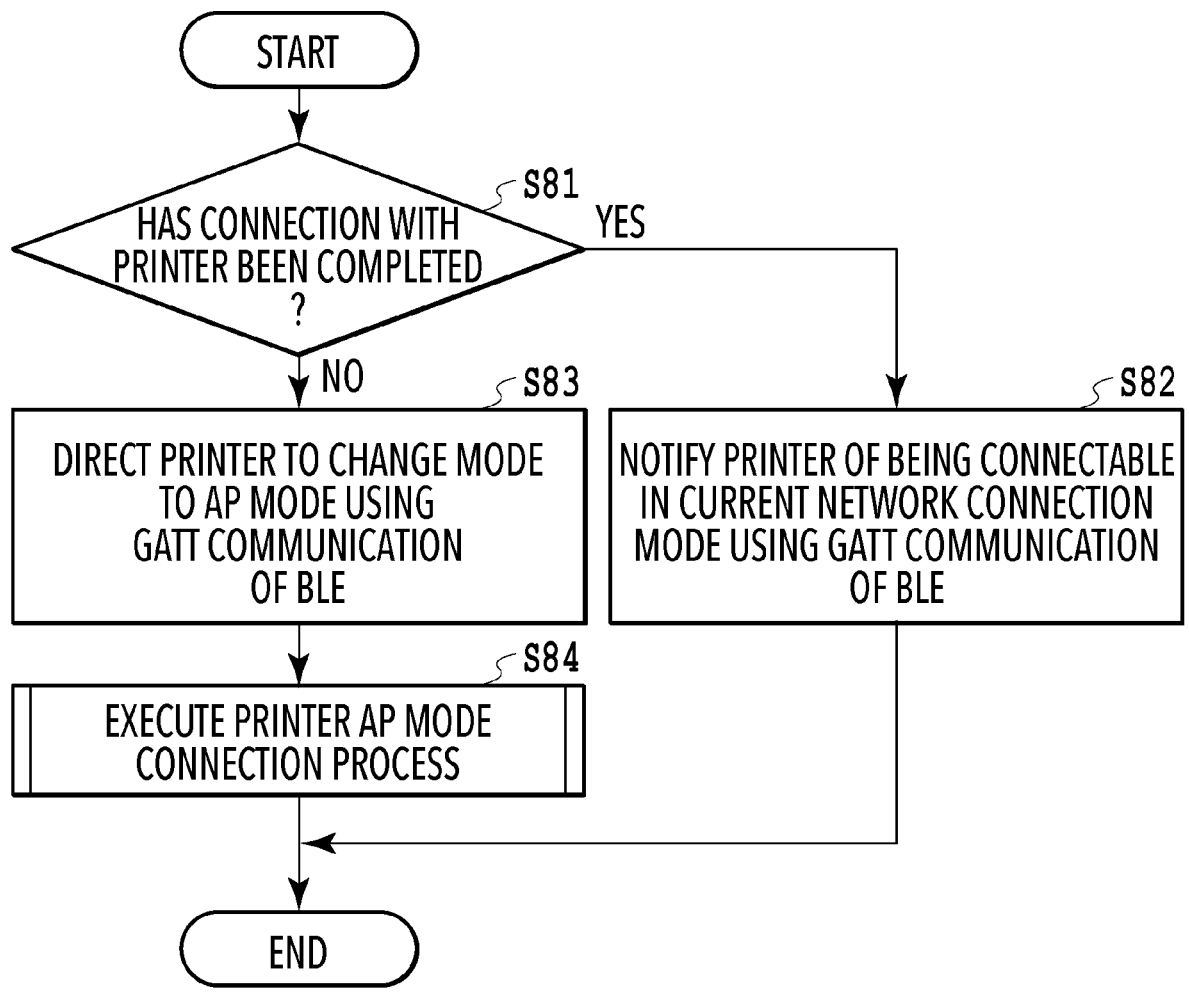
FIG. 24 is a flowchart for describing a forced AP mode connection process.

FIG. 24 is a flowchart for describing the forces AP mode connection process.

First, it is determined whether or not the information processing device and the printer are already connected to each other (Step S81). The process of the determination is the same as that of Step S72 illustrated in FIGS. 22 and 23, and thus description thereof will not be presented. In a case where the information processing device and the printer are connected to each other, the process proceeds to Step S82, and, similar to Step S71 illustrated in FIGS. 22 and 23, the printer is notified of being connectable in the current network connection mode by using GATT communication of BLE. After this notification, the process illustrated in FIG. 24 ends. On the other hand, in a case where the information processing device and the printer are not connected to each other, the printer is not connectable in the current network connection mode by using GATT communication of BLE, and accordingly, the printer is directed to temporarily change the network connection mode to the AP mode (Step S83). In accordance with the reception of the direction, the printer changes the connection mode to the AP mode and becomes an exclusive mode in which execution of a process from any other information processing device is not accepted, and waits for a connection with the information processing device. After the process for handover (in this example, printing) ends, the exclusive mode automatically ends. After a forced AP mode is directed to the printer, the process proceeds to Step S84, and, similar to Step S74 illustrated in FIG. 23, the AP mode connection process of the printer is executed.

Then, in Step S1111, the information processing device writes a direction for a transition to the AP mode in an NFC tag. Then, when detecting that the direction for the transition to the AP mode is written into the NFC tag, the printer executes the process of the transition to the AP mode.

In accordance with such a series of processes, in a case where a connection between the information processing device and the printer is established using the Wi-Fi Direct or the infrastructure mode, the connection state is maintained, and a process such as printing is executed. In a case where the connection is not established, the printer is directed to transit to the AP mode. In order to maintain a connection in the Wi-Fi Direct and the infrastructure mode as possibly as can, connections of the printer and the information processing device to the Internet are maintained as possibly as can. Since the network connection mode of the printer is not changed as possibly as can, a time loss in a connection mode change and network disconnection from other information processing devices can be prevented.

Second Embodiment

In the case of the pairing process according to the first embodiment, it is possible that a plurality of unspecified information processing devices unintentionally execute pairing using the checking dialog 800 of pairing illustrated in FIG. 10, and the PIN code display screen 200 illustrated in FIG. 5A is displayed on the display unit 160 of the communication device. In this embodiment, the unintended display of the PIN code display screen 200 is prevented.

Figure 25:
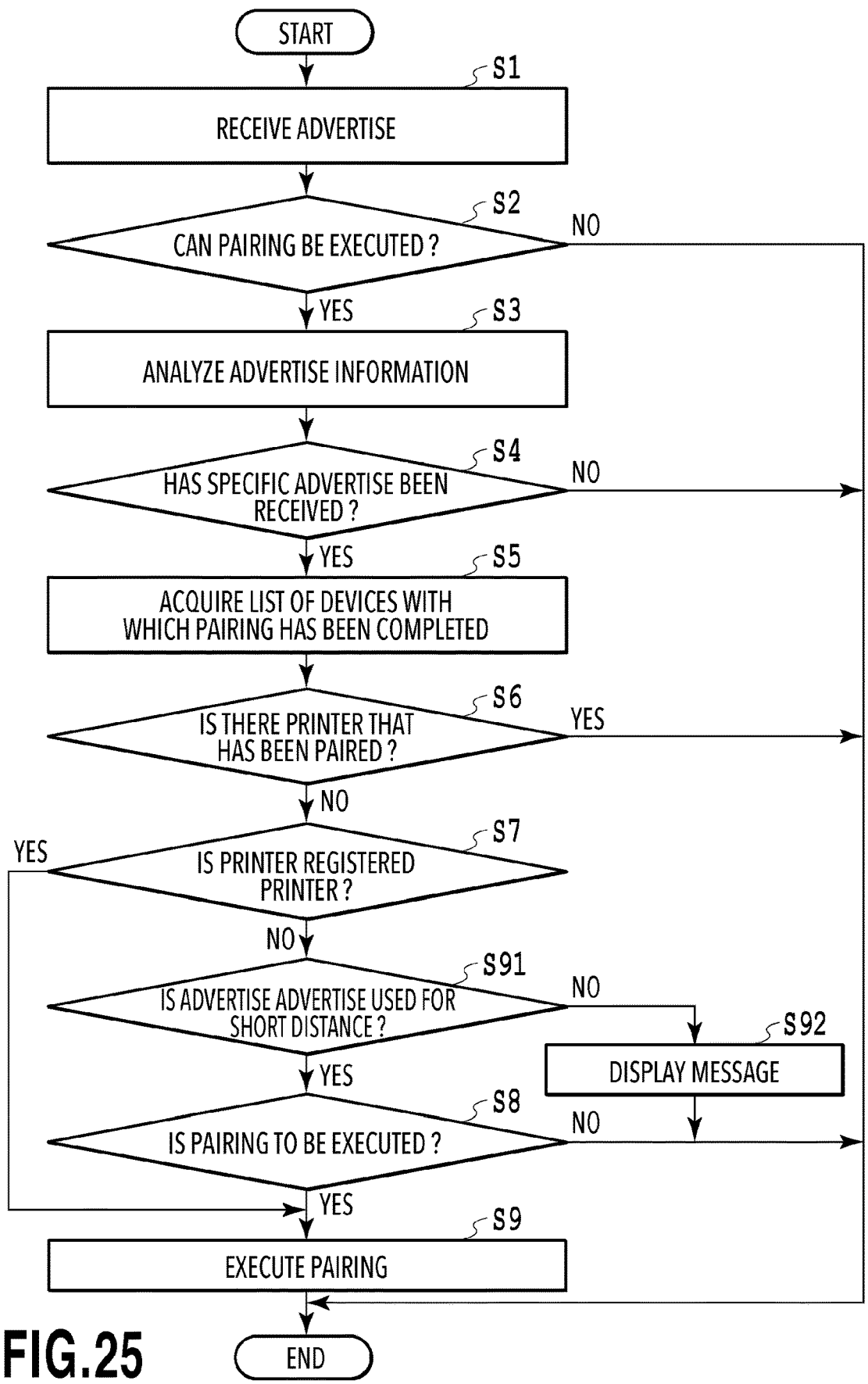
FIG. 25 is a flowchart for describing a pairing process according to a second embodiment of the present invention.

FIG. 25 is a flowchart for describing a pairing process executed by a print application. The same step number will be assigned to a process similar to that according to the embodiment described above illustrated in FIG. 9, and description thereof will not be presented.

Figure 27:
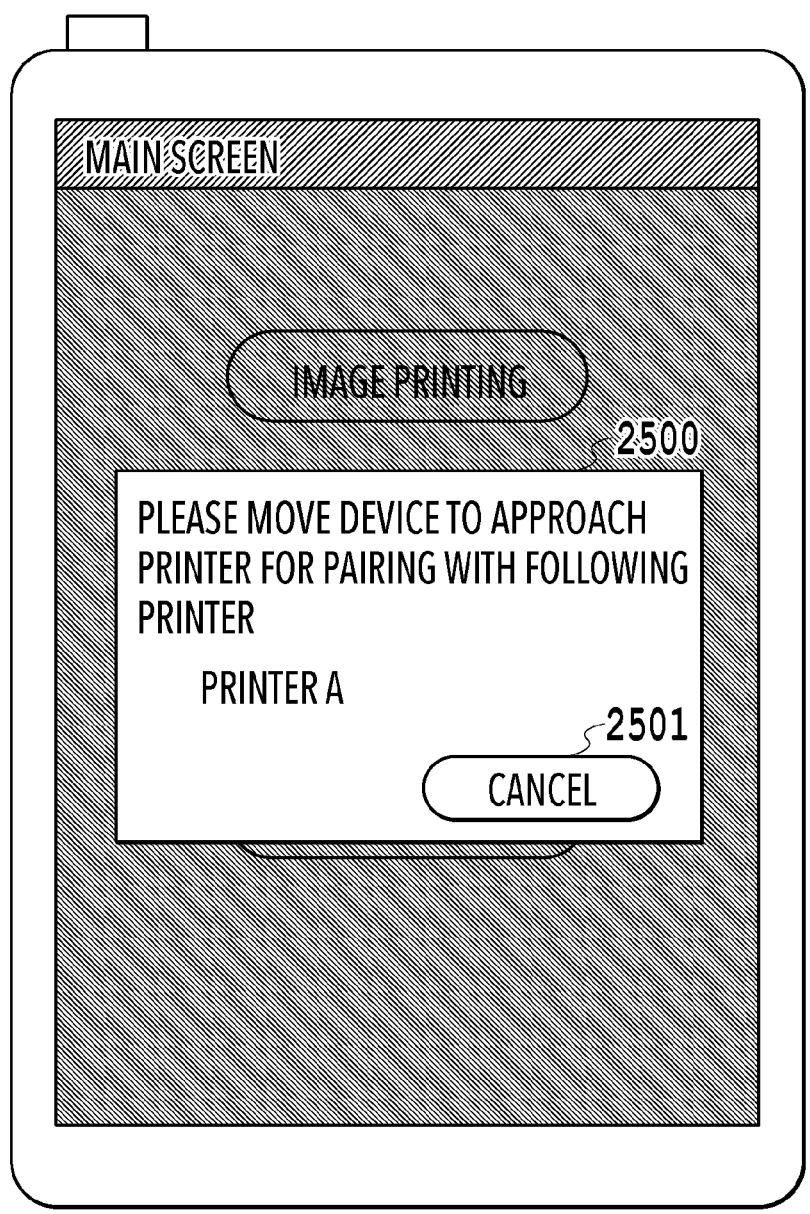
FIG. 27 is an explanatory diagram of an information display dialog.

In Step S7, in a case where a printer transmitting advertise is determined to be a registered printer described above, the process proceeds to Step S91, and it is determined whether or not the advertise from the printer is advertise used for a short distance. Here, the advertise used for the short distance is advertise adjusted to limit a reception distance by suppressing the transmission power of BLE to be low. When advertise used for the short distance is transmitted by the printer, information representing advertise used for the short distance is stored as information of the function and the state of the communication device inside advertise information. FIG. 26 is an explanatory diagram of information relating to the function and the state of the communication device inside the advertise information of this example. In this example, information representing whether or not advertise is the advertise used for the short distance is stored in an area of the 6th octet, and "1" is stored in the case of the advertise used for the short distance. In a case where advertise is not the advertise used for the short distance, "0" is stored. In a case where the advertise used for the short distance is determined from the advertise information, the process proceeds to Step S8. On the other hand, in a case where advertise is not the advertise used for the short distance, the process proceeds to Step S92, and an information display dialog 2500 as illustrated in FIG. 27 is displayed. By using this information display dialog 2500, a user is urged to move the information processing device to approach the printer. When the advertise used for the short distance is received by the information processing device, the dialog 2500 illustrated in FIG. 27 is automatically set in the non-display state, and the process proceeds to Steps S8 and S9 for executing the pairing process. In a case where a cancel button 2501 illustrated in FIG. 27 is selected by the user, the pairing process is stopped.

In this way, the pairing process according to this embodiment is limited to be executed only for an information processing device positioned at a short distance from the communication device. Accordingly, careless display of the PIN code display screen 200 illustrated in FIG. 5A in the communication device can be prevented.

Third Embodiment

In the embodiment described above, information relating to the state and the like of the communication device is configured to be stored inside the pairing information. However, the configuration is not limited to such a configuration, and, for example, the information relating to the state and the like of the communication device may be acquired using GATT communication.

Figure 28:
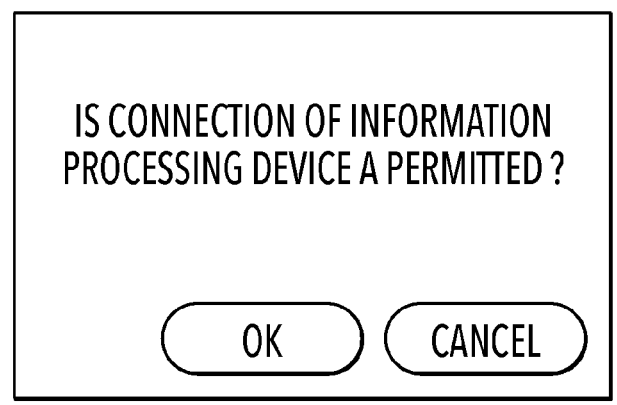
FIG. 28 is an explanatory diagram of a display screen of a communication device unit according to a third embodiment of the present invention.

In addition, in the embodiment described above, the communication device has been described which cannot execute the GATT communication in a case where pairing using the PIN code authentication is not executed. The pairing is a process for preventing a connection between a plurality of unspecified information processing devices and a communication device and thus may be realized using a different method. For example, identification information of the information processing device may be transmitted to the communication device at the time of executing BLE communication, the identification information as illustrated in FIG. 28 may be displayed on a display unit of the communication device, and a user is requested to issue a connection permission. In such a case, communication device stores identification information in the ROM, and the information processing device transmits the identification information to the communication device when GATT communication is executed. Then, the communication device compares the identification information stored in the ROM with the identification information transmitted from the information processing device and determines whether or not data transmission using the GATT communication can be executed on the basis of a result of the comparison. In a case where it is determined that data transmission using the GATT communication cannot be executed, vacant information may be returned.

OTHER EMBODIMENTS

The present invention can be realized also in a process in which a program realizing one or more functions of the embodiment described above is supplied to a system or a device through a network or a storage medium, and one or more processors of a computer in the system or the device read and execute the program. In addition, the present invention can be realized by a circuit (for example, an ASIC) realizing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing method using an information processing device that can communicate with a communication device, the information processing method causing the information processing device to execute:
   a determination step of determining whether the communication device is registered in the information processing device on the basis of advertise information in a first communication method transmitted from the communication device,
   wherein the information processing device is capable of registering the communication device on the basis of communication, by a second communication method, between the information processing device and the communication device;
   a checking step of checking with a user whether to execute pairing, on a basis of a fact that the communication device is determined not to be registered in the determination step; and an execution step of executing a predetermined process for pairing of communication, by the first communication method, with the communication device on a basis of a fact that the execution of the pairing is instructed by the user in the checking step, and executing the predetermined process on a basis of a fact that the communication device is determined to be registered in the determination step, wherein, in the execution step, the information processing device is caused to execute;

an output control step of displaying a screen used for inputting authentication information on a display unit of the information processing device, and instructing displaying predetermined authentication information to the communication device, and a transmission step of transmitting the authentication information input onto the screen to the communication device, and wherein the pairing of communication between the information processing device and the communication device is executed, on the basis of a fact that the authentication information transmitted in the transmission step and the predetermined authentication information match each other.

2. The information processing method according to claim 1, the information processing method causing the information processing device to further execute a decision step of deciding whether to execute the pairing on the basis of the advertise information transmitted from the communication device, wherein the checking step checks with the user whether to execute the pairing, on a basis of a fact that the communication device is determined to be registered in the determination step and that the pairing is determined to be executed in the decision step.

3. The information processing method according to claim 2, wherein the decision step includes a pairing completion checking step of checking whether the pairing between the information processing device and the communication device is already completed.

4. The information processing method according to claim 1, wherein the communication device has a printing function capable of printing an image on the basis of image data, the information processing method causing the information processing device to further execute an additional image data display step of extracting image data added to the information processing device and displaying the extracted image data on a display unit of the information processing device on a basis of a fact that the advertise information is received from the communication device with which the pairing is completed.

5. The information processing method according to claim 1, wherein the first communication method is BLE (Bluetooth Low Energy).

6. The information processing method according to claim 1, the information processing method causing the information processing device to further execute a registration step of registering the communication device.

7. The information processing method according to claim 6, wherein at least one of a MAC address, an IP address, and a name of the communication device is registered in the registration step.

8. The information processing method according to claim 6, wherein, in the registration step, a search for communication devices connected to a communication network is executed, and a communication device selected by the user among the plurality of communication devices detected in the search is registered.

9. The information processing method according to claim 8, wherein, in the registration step, the search is executed using the second communication method.

10. The information processing method according to claim 1, wherein the first communication method is BLE (Bluetooth Low Energy), and the second communication method is a wireless LAN.

11. An information processing method using an information processing device that can communicate with a communication device, the information processing method causing the information processing device to execute:

a determination step of determining whether the communication device is registered in the information processing device, on the basis of advertise information in a first communication method transmitted from the communication device, wherein the information processing device is capable of registering the communication device on the basis of communication, by a second communication method, between the information processing device and the communication device;

a checking step of checking with a user whether to execute pairing, on the basis of a fact that the communication device is determined not to be registered in the determination step; and an execution step of executing a predetermined process for pairing of communication, by the first communication method, with the communication device on the basis of a fact that the execution of the pairing is instructed by the user in the checking step, and executing the predetermined process on the basis of a fact that the communication device is determined to be registered in the determination step, wherein the first communication method is BLE (Bluetooth Low Energy), wherein the information processing method causes the information processing device to further execute:

a state checking step of checking a state of the communication device on the basis of the advertise information on a basis of a fact that the advertise information in the BLE is received from the communication device with which the pairing is completed in the BLE; and an instruction step of instructing the communication device, using GATT (generic attribute profile) communication of the BLE, to execute a process according to the state of the communication device checked in the state checking step.

12. The information processing method according to claim 8, wherein, in the execution step, the information processing device is caused to execute:

an output control step of displaying a screen used for inputting authentication information on a display unit of the information processing device, and instructing outputting predetermined authentication information to the communication device, and a transmission step of transmitting the authentication information input onto the screen to the communication device, and wherein the pairing of communication between the information processing device and the communication device is executed on a basis of a fact that the authentication information transmitted in the transmission step and the predetermined authentication information match each other.

13. The information processing method according to claim 12,
wherein the instructing in the output control step is an instruction for displaying the predetermined authentication information in the communication device, and
wherein the pairing of communication between the information processing device and the communication device is executed on a basis of a fact that the authentication information transmitted in the transmission step and the predetermined authentication information match each other.

14. The information processing method according to claim 11, wherein, in the instruction step, the communication device is instructed to execute a process for causing the communication device to be in an operating state on a basis of a fact that the communication device is determined to be in a dormant state in the state checking step.

15. The information processing method according to claim 14,
wherein the communication device has a printing function capable of executing a recovery process for maintaining a desirable printing state, and
wherein, in the instruction step, the communication device is instructed to execute the recovery process on a basis of a fact that the communication device is checked, in the state checking step, to be in a state for which the recovery process can be executed, and where a time required for the recovery process is a predetermined time or more.

16. An information processing method using an information processing device that can communicate with a communication device, the information processing method causing the information processing device to execute:
a determination step of determining whether the communication device is registered in the information processing device, on the basis of advertise information in a first communication method transmitted from the communication device,
wherein the information processing device is capable of registering the communication device on the basis of communication, by a second communication method, between the information processing device and the communication device;
a checking step of checking with a user whether to execute pairing, on the basis of a fact that the communication device is determined not to be registered in the determination step; and
an execution step of executing a predetermined process for pairing of communication, by the first communication method, with the communication device on the basis of a fact that the execution of the pairing is instructed by the user in the checking step, and executing the predetermined process on the basis of a fact that the communication device is determined to be registered in the determination step,
wherein the first communication method is BLE (Bluetooth Low Energy),
wherein the information processing method causes the information processing device to further execute:
a function display step of displaying a function executing handover to be selectable for the user on a basis of a fact that the advertise information in the BLE is received from the communication device with which the pairing is completed in the BLE;
an acquisition step of acquiring a network connection mode of the communication device using GATT (generic attribute profile) communication of the BLE on a basis of a fact that the function executing the handover is selected by the user from the display in the function display step;
a conclusion step of concluding a network connection method for a connection with the communication device on the basis of the network connection mode acquired in the acquisition step; and
an establishment step of establishing a connection using the network connection method determined in the determination step.

17. A non-transitory computer readable storage medium in which is stored program code configured to cause an information processing device that can communicate with a communication device to execute an information processing method comprising:
a determination step of determining whether the communication device is registered in the information processing device on the basis of advertise information in a first communication method transmitted from the communication device,
wherein the information processing device is capable of registering the communication device on the basis of communication, by a second communication method, between the information processing device and the communication device;
a checking step of checking with a user whether to execute pairing, on a basis of a fact that the communication device is not determined not to be registered in the determination step; and
an execution step of executing a predetermined process for pairing of communication, by the first communication method, with the communication device on a basis of a fact that the execution of the pairing is instructed by the user in the checking step, and executing the predetermined process on a basis of a fact that the communication device is determined to be registered in the determination step,
wherein, in the execution step, the information processing device is caused to execute:
an output control step of displaying a screen used for inputting authentication information on a display unit of the information processing device, and instructing displaying predetermined authentication information to the communication device, and
a transmission step of transmitting the authentication information input onto the screen to the communication device, and
wherein the pairing of communication between the information processing device and the communication device is executed, on the basis of a fact that the authentication information transmitted in the transmission step and the predetermined authentication information match each other.

18. An information processing device that can communicate with a communication device, the information processing device comprising:
a processor; and
a memory storing instructions to cause the processor to function as
a determination unit configured to determining whether the communication device is registered in the information processing device, on the basis of advertise information in a first communication method transmitted from the communication device, wherein the information processing device is capable of registering the communication device on the basis of communication, by a second communication method, between the information processing device and the communication device;
a display control unit configured to display, on a display portion, a display screen used for checking with a user whether to execute pairing on a basis of a fact that the communication device is determined not to be registered by the determination unit; and
an execution unit configured to execute a predetermined process for pairing of communication, by the first communication method, with the communication device on a basis of a fact that the execution of the pairing is instructed by the user on the display screen displayed by the display control unit, and executing the predetermined process on a basis of a fact that the communication device is determined to be registered by the determination unit, wherein, in the execution step, the information processing device is caused to execute;
  an output control step of displaying a screen used for inputting authentication information on a display unit of the information processing device, and instructing displaying predetermined authentication information to the communication device, and
  a transmission step of transmitting the authentication information input onto the screen to the communication device, and
wherein the pairing of communication between the information processing device and the communication device is executed, on the basis of a fact that the authentication information transmitted in the transmission step and the predetermined authentication information match each other.

* * * * *